US012565805B2

(12) United States Patent
Vejling Andersen et al.

(10) Patent No.: US 12,565,805 B2
(45) Date of Patent: Mar. 3, 2026

(54) METHOD OF HANDLING A VACUUM INSULATED GLASS UNIT ASSEMBLY

(71) Applicant: VKR Holding A/S, Hørsholm (DK)

(72) Inventors: Søren Vejling Andersen, Hørsholm (DK); Henrik Aslak Jensen, Hørsholm (DK); Allan Lindhard Nissen, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 227 days.

(21) Appl. No.: 18/693,328

(22) PCT Filed: Sep. 15, 2022

(86) PCT No.: PCT/EP2022/075661
§ 371 (c)(1),
(2) Date: Mar. 19, 2024

(87) PCT Pub. No.: WO2023/041653
PCT Pub. Date: Mar. 23, 2023

(65) Prior Publication Data
US 2024/0401396 A1 Dec. 5, 2024

(30) Foreign Application Priority Data
Sep. 20, 2021 (DK) ............................. PA202170459

(51) Int. Cl.
*E06B 3/673* (2006.01)
*E06B 3/66* (2006.01)
*E06B 3/663* (2006.01)

(52) U.S. Cl.
CPC ........ *E06B 3/67365* (2013.01); *E06B 3/6612* (2013.01); *E06B 3/66304* (2013.01)

(58) Field of Classification Search
CPC ............... E06B 3/6612; E06B 3/66304; E06B 3/67326; E06B 3/67365; E06B 3/67369; E06B 3/6775; Y02A 30/249; Y02B 80/22
See application file for complete search history.

(56) References Cited

FOREIGN PATENT DOCUMENTS

| | | | |
|---|---|---|---|
| EP | 1221526 | A1 | 7/2002 |
| WO | 2018230887 | A1 | 12/2018 |

OTHER PUBLICATIONS

International Search Report for corresponding application PCT/EP2022/075661 filed Sep. 15, 2022; Mail date Dec. 6, 2022.
Written Opinion for corresponding application PCT/EP2022/075661 filed Sep. 15, 2022; Mail date Dec. 6, 2022.

*Primary Examiner* — Lawrence D Ferguson
(74) *Attorney, Agent, or Firm* — CANTOR COLBURN LLP

(57) ABSTRACT

The present invention relates to a method of handling a vacuum insulated glass (VIG) unit assembly for a vacuum insulated glass unit, wherein the vacuum insulated glass (VIG) unit assembly comprises: a first glass sheet, a plurality of support structures on an upward facing major surface of the first glass sheet, wherein the 5method comprises the steps of: handling the VIG unit assembly by physically contacting the VIG unit assembly by one or more contact surface(s) of a handling system, and providing humidity control of ambient air surrounding the VIG unit assembly, wherein the humidity control is provided by a humidity control system providing a relative humidity of the ambient air above a minimum threshold level of 103%, such as 35%, or such as 40%.

20 Claims, 8 Drawing Sheets

METHOD OF HANDLING A VACUUM INSULATED GLASS UNIT ASSEMBLY

Figure 1:
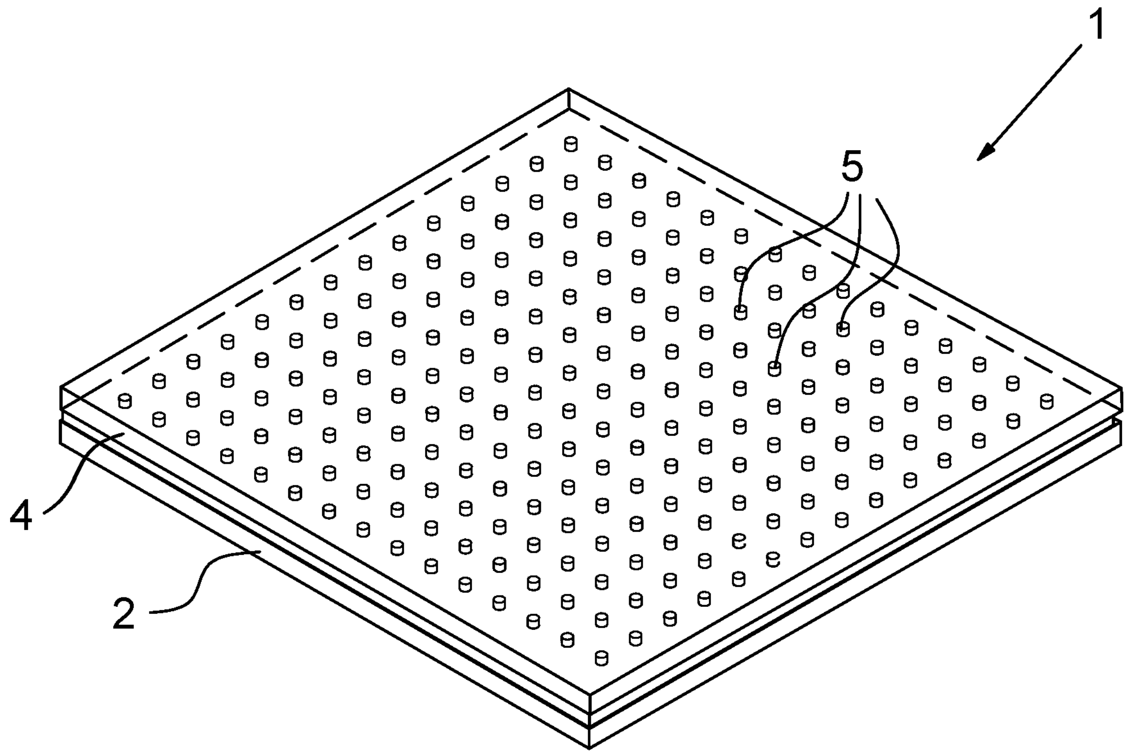

The invention relates to a method of handling an assembly for a vacuum insulated glazing (VIG) unit.

BACKGROUND

Vacuum insulated glazing (VIG) units comprise a void between two glass panes, which are surrounded by a peripheral seal and have been evacuated to create a pressure near vacuum. This low pressure void in turn results in a large pressure asserted on each glass pane towards each other due to the atmospheric pressure on the VIG unit. In order to prevent touching of the glass panes, support structures, also known as spacers or pillars, are strategically placed in pre-determined positions during the assembly of the VIG unit in order to ensure maintenance of void thickness and distance between the glass panes and to simultaneously minimize unnecessary disruptions of the field of view in the final VIG unit.

BRIEF DESCRIPTION OF THE INVENTION

Support structures (such as pillars) distributed in a gap between glass sheets of a vacuum insulated glass unit are provided in order to maintain a distance between the glass sheets when vacuum is provided. It is understood that the pressure in the cavity may be reduced to a value below e.g. 0.001 millibars or less in order to ensure an improved heat insulating effect of the VIG unit. The forces acting on the VIG panes/glass sheets at the location of the support structures may be large, and in order to assure proper force distribution across the panes of the VIG unit, the positioning of the distributed support structures is considered important. Typically, a VIG assembly comprises hundreds of discrete support structures.

The inventors have surprisingly found that after distributing support structures at a surface of a glass sheet for a VIG unit, and prior to providing the vacuum in a gap between opposing glass sheets of the VIG unit with the distributed support structures placed there between, some e.g. up to 50% of the distributed support structures may in some occasions move. The inventors have looked into this issue and have surprisingly discovered that charge transfer occurrences between elements of the manufacturing facility, e.g. a handling system, and a VIG unit assembly, e.g. a glass sheet with support structures thereon, may occur during production of the VIG unit. For example, a handling tool, of a handling system, comprising interacting parts may create friction and/or vibrations in turn generating charged ions conducted to the glass surface in contact with the handling tool. A relative displacement between connected parts, i.e. the handling tool and the glass surface, may generate charge ions in the individual parts, such as by contact and subsequent separation of the parts, e.g. as explained by the triboelectric effect. As a result, charge may accumulate on e.g. glass sheet(s) of the VIG assembly prior to providing the vacuum.

It is an object of the present invention to prevent or reduce occurrences of charge transfers that may cause pillars/support structures to move after placement, and before vacuum is provided at the cavity, e.g. by reducing, maintaining and/or eliminating charge on the VIG unit assembly, in particular the glass sheets and the support structures.

The first aspect of the present invention relates to a method of handling a vacuum insulated glass (VIG) unit assembly for a vacuum insulated glass unit, wherein the vacuum insulated glass (VIG) unit assembly comprises:

- a first glass sheet,
- a plurality of support structures on an upward facing major surface of the first glass sheet, wherein the method comprises the steps of:

- handling the VIG unit assembly by physically contacting the VIG unit assembly by one or more contact surface(s) of a handling system, and
- providing humidity control of ambient air surrounding the VIG unit assembly, wherein the humidity control is provided by a humidity control system providing a relative humidity of the ambient air above a minimum threshold level of 30%, such as 35%, or such as 40%.

The inventor(s) have surprisingly discovered that some of the support structures may sometimes move due to static electricity e.g. generated when a handling system touches and/or moves relative to the VIG assembly, and that this may more often occur when the ambient air is of low humidity. A high humidity of the ambient air provided by humidity control reduces this occurrence and aids in assuring that the support structures are maintained in their intended positions. This is mainly because of the water content making the humid air conductive, such that it can absorb and distribute charges. Consequently, the static charge build up will dissipate more readily in ambient air of high humidity.

Advantageously, the humidity control system may help in reducing the likelihood of movement of some support structures due to spontaneous static electricity discharge. By the humidity control system, the ambient air contain sufficient amount of water to help in reducing build up of static electricity on the VIG unit assembly or nearby elements, which carries the risk of displacing the support structures in the event of spontaneous electric discharge, such as brought upon by touching and relative displacement between the VIG unit assembly and the handling system. Additionally, by the humidity control of the ambient air, the entire VIG unit assembly may be surrounded by the high humidity air, allowing for symmetric and even control of static electricity, e.g. by provoked or controlled discharge, across the VIG unit assembly.

The humidity control may accordingly help to increase the yield of VIG units with correctly positioned support structures when the gap between the glass sheets is evacuated. This may in the end help to enhance the general, overall quality of the VIG units produced as it may help to reduce the number of weaker VIG units that may be more prone to breakage that provides an undesired pressure increase in the gap so that the insulating effect of the evacuated gap is lost and the VIG unit needs replacement.

In one or more embodiments, the humidity control system is arranged to reduce, maintain or increase the relative humidity level of the ambient air, such as at least prior to evacuation of the VIG unit assembly and/or such as at least during handling of the VIG unit assembly.

In one or more embodiments, in the step of handling the VIG unit assembly, the VIG unit assembly is surrounded by ambient air subjected to the humidity control. Preferably, the ambient air, subjected to humidity control and surrounding the VIG unit assembly during handling, is of a relative humidity above the minimum threshold level of 30%, such as 35% or 40%.

In one or more embodiments, the step of humidity control of ambient air surrounding the VIG unit assembly is provided during handling of the VIG unit assembly. Additionally or alternatively, the step of humidity control of ambient air surrounding the VIG unit assembly is provided prior to handling of the VIG unit assembly.

In one or more embodiments, the handling of the VIG unit assembly may involve the one or more contact surfaces of the handling system and may include moving the VIG unit assembly, e.g. by pushing, conveying, lifting etc., and/or it may include directly or indirectly touching the VIG unit assembly by the one or more contact surfaces, e.g. by supporting and/or holding the VIG unit assembly or by placing an element on the VIG unit assembly, such as a second glass sheet and/or support structures.

In one or more embodiments, a static electric field may be provided by the handling system and/or by another element in the manufacturing facility, which may be neither in direct nor in indirect contact with the VIG unit assembly, but in close vicinity of the VIG unit assembly. A relative movement between the VIG unit assembly and the handling system and/or element within the manufacturing facility being in close vicinity to the VIG unit, may cause an unwanted charge build up leading to undesirable support structure movement, e.g. charge on the glass sheet may build up caused by a movement of the VIG unit assembly a across non-conducting surface such as conveyor belts, plastic etc. The elements and/or the handling systems may be considered in the vicinity of the VIG unit assembly if they are within 3 cm, such as within 2 cm or such as within 1 cm of the VIG unit assembly.

In one or more embodiments, the humidity control is undertaken of the ambient air at a temperature between 10-40° C., such as between 15-30° C., or such as between 19-25° C.

In one or more embodiments, the humidity control is provided in sufficiently closed environment, such as inside a cabin, enclosure or building of a manufacturing facility, which is typically kept sufficiently closed for the majority of the manufacturing process. The closed environment is preferably configured to allow sufficient control of the humidity level of the air around the VIG unit assembly by the humidity control system.

In one or more embodiments, the humidity control system is configured to provide a relative humidity of the ambient air below 80%, such as below 70%. Advantageously, by restricting the amount of relative humidity of the ambient air, the risk of condensation can be reduced.

In one or more embodiments, the vacuum insulated glazing (VIG) unit further comprises a second glass sheet on top of the first glass sheet, wherein the second glass sheet is arranged so that a downward facing major surface of the second glass sheet faces the support structures, and so that the second glass sheet supports on a spacing arrangement providing a gap between said downward facing major surface of the second glass sheet and said upward facing major surface of the first glass sheet, wherein said gap has a height that is larger than the height of said support structures placed on the upward facing major surface of the first glass sheet.

The method may comprise the steps of:

handling the VIG unit assembly, i.e. including a first and second glass sheet, by physically contacting the VIG unit assembly by one or more contact surface(s) of a handling system, and providing humidity control of ambient air surrounding the VIG unit assembly, wherein the humidity control is provided by a humidity control system providing a relative humidity of the ambient air above a minimum threshold level of 30%, such as 35%, or such as 40%.

In one or more embodiments, the humidity control system provides a relative humidity of the ambient air between 30% and 90% relative humidity, such as between 40% and 80% relative humidity.

The relative humidity is a measure of the ratio between maximum possible amount of water vapour that can be contained in a unit of air at a specific temperature to the measured amount of water vapour actually present in the unit of air, and presented in percentage. With increasing temperature, the air can contain more water vapour, whereby the relative humidity decreases. Preferably, the humidity control system provides a relative humidity of the ambient air between 40% and 60%.

In one or more embodiments, the method comprises the step of introducing water into the ambient air surrounding the VIG unit assembly through one or more discharge opening(s) of a water discharge arrangement of the humidity control system.

In one or more embodiments, the water discharge arrangement comprises one or more water sources and a flow application system arranged to provide a flow of air from the water discharge arrangement into the ambient air surrounding the VIG unit assembly. Wherein the flow application system may comprise one or more fans, blowers and/or pressure system for producing a flow of air. The flow of air may be arranged so as to pick up drops of water from the water source and transport these to the ambient air.

In one or more embodiments, the water discharge arrangement is arranged to introduce water into the ambient air by mixing water with pressurized air and discharging the water through one or more discharge openings. One or more fans may be provided to assist in the distribution of the moisture. It may have a humidification performance (l/h, litre/hour) of at least 5 l/h, such as at least 10 l/h, such as between 10 and 60 l/h.

In one or more embodiments, the water discharge arrangement may be arranged to provide a discharge of a mist, fog and/or spray of water-containing air to the ambient air. The water-containing discharge may be heated or un-heated, such as originating from steam or from a water source from which water droplet are created using vibrations means, such as ultrasonic devices. The water-containing discharge may be provided through a discharge opening, e.g. provided with a nozzle, by means of pressurized air.

In one or more embodiments, the humidity control system comprises two or more water discharge arrangements distributed around the VIG unit assembly.

In one or more embodiments, the humidity control system comprises circulation means for distribution of the water-containing air discharged from the water discharge arrangement so as to surround the VIG unit assembly. The circulation means may comprise one or may fans, blowers or other means for providing a flow of the water-containing air for the purpose of distribution throughout the ambient air.

In one or more embodiments, the method comprises the step of providing ions of controlled polarity at one or more outer major surfaces of the vacuum insulated glass (VIG) unit assembly and/or at one or more outer surfaces of a handling system by one or more ionizing devices.

In one or more embodiments, the ions are provided so as to maintain or change the electrostatic potential in the glass sheet(s) and/or the handling system. The ions may be provided towards outer surfaces of the handling system, which are to come into contact or to be in the vicinity of the VIG unit assembly. The change may involve reducing or increasing the electrostatic potential of a glass sheet, e.g. so as to reduce, minimize, prevent or eliminate a difference in electrostatic charge between glass sheets of the VIG unit or between a glass sheet and the handling system and/or another element in manufacturing facility, e.g. non-conductive materials in the vicinity of the VIG unit assembly. Preferably, the charges on a glass sheet is reduced by the ions provided.

The inventors have surprisingly discovered that providing ionizing devices(s) aids in assuring that the support structures are maintained in the intended position. Advantageously, the static charge build up on the VIG unit assembly may be reduced by the ionizing device, such that uncontrolled electric discharge during manufacturing of the VIG unit assembly is reduced.

In one or more embodiments, the ionizing device(s) preferably comprise one or more ionizing device(s) configured to reduce, and potentially neutralise, static electricity, also known as an electrostatic discharge ionizer or static eliminators.

In one or more embodiments, the ionizing device may be arranged to ionize or electrically charge air molecules. In one or more embodiments, the ionizing device may preferably be an electric ionizing device utilizing corona discharge phenomenon. In one or more embodiments, the discharge is provided by applying a high voltage electric current in electron probe, which may be in the form of a sharp point, pin, needle or wire, which causes generation of an electrostatic field and ionization of the surrounding air.

The corona ionization may be of the AC or DC type, preferably pulsed AC type, which produces pulses of both polarity of ions. Advantageously, by the pulsed method the amount of ions generated may be higher and the oscillating frequency can be changed, making it in particular suitable for moving targets. The electron probe may preferably be made of tungsten.

In one or more embodiments, the ionizing device may preferably be arranged so that the generation level of the ions may be controlled by the applied voltage and optionally also by the applied pulse width, based on manual input and/or input from one or more feedback sensors arranged to detect electrostatic potential of the target surface.

In one or more embodiments, the ionizing device comprises a feedback system comprising one or more feedback sensors arranged to detect electrostatic potential of the target surface and providing a sensing output accordingly to a controller of the ionizing device. The ionizing device may be controlled based on the sensing output, e.g. such that a larger quantity of one polarity of ions is discharged per unit time compared to the other. The ionizing device may thereby more readily obtain, and possibly also maintain, the desired electrostatic potential of the target surface. The controlled ionization may be provided automatically and/or adjusted according to application.

In one or more embodiments, the one or more ionizing device(s) provides ions of controlled polarity during one or more of the relative displacements between the one or more contact surface(s) of the handling system and the VIG unit assembly.

The ionizing device(s) may thereby help to increase the yield of VIG units with correctly positioned support structures. The positioning of the support structures can potentially have significant impact on the resulting quality of the VIG unit, e.g. in terms of life expectancy and insulation performance. If even some support structures are misaligned, the VIG unit may become more prone to breakage due to an undesired distribution or level of pressures across the VIG unit gap.

In one or more embodiments, the ionizing device(s) are arranged to provide a flow of ions towards one or more of the outermost major surfaces of the VIG unit assembly, e.g. the major surface(s) facing away from the gap.

In one or more embodiments, the one or more ionizing devices is arranged to provide a pressurized flow of ions, such as a pressurized airflow of ions. Preferably, a 4 bar (58 Psi) air pressure may be used.

In one or more embodiments, the one or more ionizing device(s) provides an air flow of ions of controlled polarity towards one or more outer major surfaces of the VIG unit assemblies and/or at one or more outer surfaces of a handling system, so as to change the electrostatic potential in the glass sheet(s) and/or the handling system.

In one or more embodiments, a volume of air, or any other suitable medium, may be provided to the ionizing device, be at least partly ionized by the ionizing device and further guided towards the VIG unit assembly. The air may be driven by pressure differences, e.g. the air may be provided by a pressurized source of air and suitable piping connection(s) to the ionizing device, and/or the air may be driven by a blower or fan. The air may be provided by a source of filtered air, e.g. reused air from inside or outside the manufacturing facility, which is filtered prior to reaching the ionizing device. The driven flow of ionized air ensures that the generated ions reaches the target surface, e.g. a surface of the VIG unit assembly.

In one or more embodiments, the air flow of ions is provided to an outer surface of the VIG unit, e.g. the upward facing major surface of the first glass sheet and/or the downward facing major surface of the second glass sheet.

In one or more embodiments, the one or more ionizing devices comprises one or more ionizing bars each comprising one or more flow outlet(s) arranged so as to provide at least one line of flow outlet(s) extending across a major surface of VIG unit assembly.

In one or more embodiments, the ionizing bar may be an elongated ionizing device providing one or more lines of flow outlets along the longitudinal extent thereof, e.g. so that a sheet of polarized ions may be provided by the ionizing device. The ionizing device may be arranged to provide an operating length of at least 0.5 meter, such as between 0.5 and 2.5 meters, measured along the flow direction of the ions, e.g. perpendicular to the longitudinal extent of the ionizing bar. The operating width may be determined by the length of the ionizing bar and the distribution of flow outlets, e.g. so as to be larger than a length or width of the VIG unit assembly. I.e. the ionizing bar may advantageously provide a uniform distribution of ions across the entire planar extent of the VIG unit.

In one or more embodiments, the ionizing bar is arranged perpendicular to a transport direction of the glass sheet. In one or more embodiments, the at least one line of flow outlet(s) is arranged to provide a volume of ions reaching substantially an entire extent of a major surface of the VIG unit assembly.

In one or more embodiments, the one or more ionizing devices comprises one or more ionizing bars each comprising one or more flow outlet(s) arranged so as to provide a first line of flow outlet(s) extending above a plane comprising a major surface of the VIG unit assembly and a second line of flow outlet(s) extending below the plane comprising the major surface of the VIG unit assembly.

The flow outlets may be provided at a distance above and below the plane, measured perpendicular to the plane. The location of the flow outlets may in some embodiments not be overlapping the VIG unit assembly, i.e. not directly below or above, but to the side of the assembly, at a distance from an edge of the VIG unit assembly.

In one or more embodiments, the line(s) of flow outlet(s) are arranged parallel to a transport direction of the VIG unit assembly, such as the transport direction of the VIG assembly being provided by the flow of ions, e.g. during, immediately prior and/or immediately after treatment by the ionizing bars.

The line(s) of flow outlet(s) may be extending beside the VIG unit assembly, at a distance from the edge of the VIG unit assembly, measured along said plane. The line may be of an extent corresponding to at least an extent, e.g. width/length, of the VIG unit assembly orientated in parallel with the line.

In one or more embodiments, one or more first ionizing bars are arranged to provide the first line of flow outlets while one or more second ionizing bars are arranged to provide the second line of flow outlets. The properties of the ion flow, e.g. charge properties, flow direction, operating length etc. provided by the first and second ionizing bars may be controlled individually.

In one or more embodiments, the flow outlets of the first line are directed towards the upward facing major surface of the second glass sheet and the flow outlets of the second line are directed towards a downward facing major surface of the first glass sheet.

The flow outlets may be arranged along a longitudinal extent of the ionizing bar. The flow outlet may comprise any shape or size of aperture for discharging ionized air, such as flow outlet arranged to provide a substantially laminar flow structure of the ionized air flow. In one or more embodiments, the flow outlets comprises a plurality of nozzles. Optionally, guide outlets may be provided adjacent the flow outlets, such as between the flow outlets, to aid in providing laminar flow, high speed static elimination, and for reduction of dust adhesion on the ionized air flow.

In one or more embodiments, the VIG unit assembly is handled by being transported by a transport system of the handling system, such as a conveyor arrangement, an industrial robot, vehicle or other transport means, in the air subjected to humidity control. It is generally understood that after the support structures are arranged at the first glass sheet, the assembly is preferably transported with the major surfaces of the glass sheets maintained substantially horizontal, e.g. by the conveyor arrangement.

In one or more embodiments, the VIG unit assembly is provided on the transport system by placing a downward facing major surface of the VIG unit assembly on one or more contact surface(s) of the transport system.

In one or more embodiments, the handling system may comprise several transport system, such as a first transport system for transporting the first glass sheet and a second transport system for transporting the second glass sheet, prior to pairing of the glass sheets.

In one or more embodiments, the method further comprises the step of transporting the VIG unit assembly by a conveyor arrangement comprising one or more conveyor belt(s), conveyor roller(s) and/or conveyor trolley(s) in physical contact with the VIG unit assembly, and wherein the transportation of the VIG unit assembly by the conveyor arrangement is undertaken in the ambient air subjected to humidity control by the humidity control system.

A downward facing major surface of the first glass sheet may be in direct physical contact with one or more contact surface(s) of the conveyor belt(s), e.g. upward facing contact surface(s) of the conveyor belt(s).

In one or more embodiments, a conveyor belt, such as an endless belt, will displace the VIG unit assembly when in contact. At the point of disrupting this contact, e.g. at positions where an endless belt travels around a pulley, a relative displacement between the VIG unit assembly and the conveyor belt can be provided and potentially cause charged ions on the VIG unit assembly. In addition, any friction occurring between the glass pane and the conveyor belt and within the conveyor arrangement may cause charged ions conducted to the VIG unit assembly and in particular to one or both glass sheets. Another relative displacement may be provided by moving the conveyor arrangement away from the glass sheet, or vice versa, such that a distance is created e.g. for preparing the VIG unit assembly for further handling.

In one or more embodiments, each conveyor belt is an endless belt surrounding one or more pulleys, wherein the pulley(s) are concentrically connected to a shaft being arranged to rotate about a longitudinal extent of the shaft so as to move the conveyor belt about the pulley(s).

In one or more embodiments, the transportation of the VIG unit assembly by the conveyor arrangement is undertaken in the ambient air subjected to humidity control by the humidity control system and while providing ions of controlled polarity at one or more outer major surfaces of the vacuum insulated glass (VIG) unit assembly and/or at one or more outer surfaces of a handling system by one or more ionizing devices, so as to change the electrostatic potential in the glass sheet(s) and/or the handling system.

The handling system may comprise said conveyor arrangement, comprising one or more conveyor belt(s), conveyor roller(s) and/or conveyor trolley(s). The handling system may comprise further conveyor arrangements, each comprising one or more conveyor belt(s), conveyor roller(s) and/or conveyor trolley(s), which may be individually controllable or controllable in groups, wherein a group of conveyor belt(s), conveyor roller(s) and/or conveyor trolley(s) may be arranged with parallel orientation of direction of transport and wherein groups of conveyor belt(s), conveyor roller(s) and/or conveyor trolley(s) may be arranged in succession, in and end to end configuration, so that glass sheet(s) may be transported between group(s) of conveyor belt(s), conveyor roller(s) and/or conveyor trolley(s) of the conveyor arrangements.

In one or more embodiments, the conveyor arrangement may comprise roller(s), such as bar rollers for back/forth translation of the glass sheet(s) along a single direction being perpendicular to the longitudinal extent of the bar, and/or ball rollers, e.g. which can additionally provide 360 degree rotation of the glass sheet(s).

In one or more embodiments, the one or more contact surface(s) of the handling system is provided by the conveyor arrangement, such as by one or more conveyer belt(s) of the conveyor arrangement, wherein the one or more contact surface(s) comprises an electric resistance of less than $10^{12}$ ohm/m$^2$, and wherein the method further comprises the step of reducing electrostatic charge on the one or more contact surface(s) by a static discharge arrangement providing an electrically conductive connection between the one or more contact surface(s) and a ground connection and/or other charge reservoir.

The inventor(s) have discovered that some of the support structures may sometimes move due to static electricity build up, which discharges when e.g. the conveyor belt(s) moves relative to the VIG assembly. The static discharge arrangement reduces this occurrence and aids in assuring that the support structures are maintained in the intended position.

Advantageously, by the static discharge arrangement, charge build up can be prevented in that charge created during handling of the VIG unit assembly can be dissipated by the static discharge arrangement, effectively minimizing electric charge potential in the VIG unit assembly. In one or more embodiments, the static discharge arrangement is configured to discharge the one or more contact surface(s) by the electrically conductive connection(s) connected to the ground and/or other charge reservoir.

The electric resistance may be measured from electric ground or earth to the contact surface(s) arranged to come into contact with the VIG unit assembly, when transporting and/or supporting the VIG unit assembly. The static discharge arrangement may comprise or be connected to a charge reservoir, which is not necessarily a true ground connection but may still provide means for reduction of electrostatic charge potential and may not need to fully eliminate it. However, in preferred embodiments, the static discharge arrangement dissipates static build up to a ground/earth connection, i.e. the earth's conductive surface.

In one or more embodiments, the static discharge arrangement is configured to reduce static charge on one or both glass sheets by one or more electrically conductive connection(s) provided between the static discharge arrangement and the one or more glass sheets.

In one or more embodiments, at least a part of the electrically conductive connection(s) are provided by the conveyor arrangements, such as by metal-containing or carbon containing structures of the conveyor arrangement. Preferably, the conveyor belts may be carbon filled. In one or more embodiments, the conveyor belts are electrostatic discharge materials, e.g. with a resistance below $10^{13}$ ohm/m$^2$, such as below $10^{12}$ ohm/m$^2$ or such as below $10^{11}$ ohm/m$^2$. Additionally or alternatively, the electrically conductive connection(s) are provided by one or more electrically conductive brushes in physical contact with the VIG unit assembly. The brush(es) may be touching the first and/or second glass sheet, e.g. the outer surfaces of the first and/or second glass sheets. The brush(es) may be distributed along the length and/or width of a major outer surface of the VIG unit assembly, e.g. proximate to the VIG unit edge, so as to provide a more uniform discharge.

In one or more embodiments, the static discharge arrangement is configured to reduce, such as prevent and/or eliminate, static charge in the contact surface(s) by one or more electrically conductive connection(s) provided between the static discharge arrangement and the contact surface(s). The electrically conductive connection(s) may be provided by elements of the handling system, such as rollers, axes etc. of the conveyor arrangement comprising the conveyor belt(s).

In one or more embodiments, the static discharge arrangement is configured to reduce, such as prevent and/or eliminate, static charge on one or both glass sheets of the VIG unit assembly, so that a difference in electrostatic charge potential measured between the first and second glass sheets is approximately less than 5 kV, such as less than 3 kV, preferably less than 2 kV. E.g. the first glass sheet may be at 0 kV while the second glass sheet may be at 2 kV.

In one or more embodiments, the static discharge arrangement is configured to reduce, such as prevent and/or eliminate, static charge on one or both glass sheets of the VIG unit assembly, so that a difference in electrostatic charge potential measured between the first and second glass sheets is approximately between 0 and 5 kV, such as between 0 and 3 kV, preferably between 0 and 2 kV.

In one or more embodiments, the static discharge arrangement is configured to reduce, such as prevent and/or eliminate, electrostatic charge on the one or more contact surface(s) during transport of the VIG unit assembly on the conveyor belt(s).

The static discharge arrangement may be configured with electrically conductive connection in electrical connection with the contact surfaces arranged to come into physical contact with one or both glass sheets, e.g. conductive elements, such as wires, may be arranged to the contact surfaces. The static discharge arrangement may be configured with different types of electrically conductive connections, e.g. the connections may comprise elements of the handling system, e.g. metal parts, and/or comprise electrically conductive wires.

In one or more embodiments, the method comprises the step of handling the VIG unit assembly by physically contacting the VIG unit assembly by one or more contact surface(s) of the handling system, and providing a relative displacement between the one or more contact surface(s) and the VIG unit assembly, wherein the relative displacement is undertaken in the ambient air subjected to humidity control by the humidity control system.

The VIG unit assembly may be handled by supporting, touching, lowering, lifting, pushing, conveying etc. e.g. by means of a conveyor arrangement and/or an industrial robot or any other handling tool of the handling system.

In one or more embodiments, a displacement system of the handling system provides a relative displacement between the one or more contact surface(s) of the handling system and the VIG unit assembly, in a direction substantially perpendicular to a major surface of the VIG unit assembly, and wherein the relative displacement is undertaken in the ambient air subjected to humidity control by the humidity control system.

In one or more embodiments, the displacement system is arranged to lower the contact surface(s) of the handling system, e.g. provided by conveyor belt(s), so as to create a spacing distance. The spacing distance may be measured between the contact surface(s) and the downward facing major surface of the first glass sheet. In lowering the contact surface(s) away from the VIG unit assembly, the VIG unit assembly may subsequently be lowered onto a support system, e.g. comprising a plurality of support elements, arranged to come into contact with the downward facing surface of the VIG unit assembly at discrete and separated points thereon.

Alternatively or additionally, the displacement system may be arranged to lift the support system, so that it come into contact with the downward facing surface of the VIG unit assembly, and so that VIG unit assembly is lifted off the contact surface(s) of the handling system, e.g. provided by conveyor belt(s), whereby the spacing distance is created.

In one or more embodiments, the support elements are arranged to be displaceable between and/or adjacent to conveyor belt(s) of the handling system.

In one or more embodiments, a first position is provided with the contact surface(s) of conveyor belt(s) in physical contact with the first glass sheet, a second position is provided with the spacing distance between the contact surface(s) of conveyor belt(s) and the glass sheet and the displacement system may be configured to provide the relative displacement between the conveyor belt(s) and the VIG unit assembly from the first position to the second position at a first speed. The first speed may be provided as a change in speed, such as an increase in speed from the first to the second position. By increasing the speed during the relative displacement between the conveyor arrangement and the VIG unit assembly, such as gradually or stepwise increasing the speed, a potentially lower charge transfer may occur between contact surface(s) of the conveyor belt and the VIG unit assembly, while the subsequent larger displacement speed allows for quicker manufacturing.

In one or more embodiments, the humidity control system is arranged to reduce electrostatic charge on the contact surface(s) during displacement of the contact surface(s), e.g. conveyor belt(s), and/or the support element(s) by the displacement system.

In one or more embodiments, the relative displacement is further undertaken while providing ions of controlled polarity at one or more outer major surfaces of the VIG unit assembly and/or at one or more outer surfaces of the handling system by one or more ionizing devices.

In one or more embodiments, the relative displacement between the one or more contact surface(s) of the handling system and the VIG unit assembly is undertaken in the ambient air subjected to humidity control by the humidity control system and while the one or more contact surface(s) of the handling system is provided by the conveyor arrangement, such as by one or more conveyer belt(s) of the conveyor arrangement, wherein the one or more contact surface(s) comprises an electric resistance less than $10^{12}$ ohm/$m^2$ and wherein the method further comprises the step of reducing electrostatic charge on the one or more contact surface(s) by a static discharge arrangement by providing an electrically conductive connection between the one or more electrically conducting contact surface(s) and a ground connection and/or other charge reservoir. Optionally, the relative displacement may be provided while additionally providing ions of controlled polarity at one or more outer major surfaces of the vacuum insulated glass (VIG) unit assembly and/or at one or more outer surfaces of a handling system by one or more ionizing devices, e.g. so as to change or maintain the electrostatic potential in the glass sheet(s) and/or the handling system.

In one or more embodiments, the method further comprises the step of controlling the relative humidity of the ambient air surrounding the VIG unit assembly based on one or more inputs comprising humidity measurement data of the ambient air.

In one or more embodiments, a humidity sensor system is configured to obtain humidity measurement data of the ambient air surrounding the VIG unit assembly and provide an input accordingly, and wherein the humidity control system is arranged to control the relative humidity of the ambient air surrounding the VIG unit assembly based on input from the humidity sensor system. The humidity control may at least be provided during handling of the VIG unit assembly, e.g. such as continuously and/or periodically during handling of the VIG unit assembly.

In one or more embodiments, the humidity sensor system comprises one or more humidity sensors for measuring the humidity of the ambient air. The humidity sensor system may be arranged for continuous and/or periodic measurements of the relative humidity of the ambient air and provide an input accordingly to the humidity control system.

In one or more embodiments, the humidity sensor system comprises one or more temperature sensors for measuring the temperature of the ambient air.

In one or more embodiments, the humidity control system comprises a data processor for processing the inputs received and provide an output for controlling the water discharge arrangement.

In one or more embodiments, the humidity control system is arranged to automatically control the water discharge arrangement based on input from the humidity sensor so as to provide a relative humidity within the ambient air above a threshold level or a hysteresis value related thereto.

In one or more embodiments, the humidity control system comprises an alarm system arranged to provide a signal, such an audible and/or visual signal, when the measured humidity in the ambient air is below a minimum threshold level and/or above a maximum threshold level.

In one or more embodiments, the threshold level is pre-set and/or calculated by the humidity control system according to a table or algorithm. The alarm signal may e.g. be provided, potentially continuously provided, by an audible (e.g. siren, multi-tone alarm sound) and/or visual (e.g. light, beacon etc.) alarm system while the humidity of the ambient air is below a minimum threshold level or above a maximum threshold level. Advantageously, by the alarm system, the workers are notified of potentially harmful humidity levels, so that the humidity level cam be fixed and/or the production process can be paused.

In one or more embodiments, the present invention relates to a method for reducing unintended movement of support structures during handling of a VIG unit assembly for a vacuum insulated glass unit, wherein the insulated glass (VIG) unit assembly comprises:

- a first glass sheet, and a plurality of support structures on an upward facing major surface of the first glass sheet
- a second glass sheet on top of the first glass sheet, wherein the second glass sheet is arranged so that a downward facing major surface of the second glass sheet faces the support structures, and so that the second glass sheet supports on a spacing arrangement providing a gap between said downward facing major surface of the second glass sheet and said upward facing major surface of the first glass sheet, wherein said gap has a height that is larger than the height of said support structures placed on the upward facing major surface of the first glass sheet, wherein the method comprises providing humidity control of ambient air surrounding the VIG unit assembly, wherein the humidity control is provided by a humidity control system providing a relative humidity of the ambient air above a minimum threshold level of 30%, such as 35%, or such as 40%.

The present disclosure further relates to a method of handling a vacuum insulated glass (VIG) unit assembly for a vacuum insulated glass unit, wherein the insulated glass (VIG) unit assembly comprises:

- a first glass sheet,
- a plurality of support structures on an upward facing major surface of the first glass sheet by means of a support structure placement arrangement, wherein the method comprises the step(s) of:

- reducing or maintaining the electrostatic charge potential of the first glass sheet by a charge modulation system, e.g. so that the electrostatic charge potential is below 5 kV, such as below 3 kV, preferably below 1 kV.

The second aspect relates to a method of handling a vacuum insulated glass (VIG) unit assembly for a vacuum insulated glass unit, wherein the insulated glass (VIG) unit assembly comprises:

- a first glass sheet,
- a plurality of support structures on an upward facing major surface of the first glass sheet by means of a support structure placement arrangement,
- a second glass sheet on top of the first glass sheet, wherein the second glass sheet is arranged so that a downward facing major surface of the second glass sheet faces the support structures, and so that the second glass sheet supports on a spacing arrangement providing a gap between said downward facing major surface of the second glass sheet and said upward facing major surface of the first glass sheet, wherein said gap has a height that is larger than the height of said support structures placed on the upward facing major surface of the first glass sheet, wherein the method comprises the step(s) of:

- reducing or maintaining a difference in electrostatic charge potential between the first glass sheet and the second glass sheet by a charge modulation system, so that the difference in electrostatic charge potential is below 8 kV, such as below 5 kV, preferably below 2 kV.

Advantageously, undesired electric discharge events via the support structures are reduced, and potentially eliminated, as the electrostatic charge potential generated on the first glass sheet or between the paired glass sheets are reduced by the charge modulation system. Accordingly, a lower failure rate and higher yield of VIG units can be obtained.

Advantageously, the charge modulation system may, as an addition or alternative to reducing, be maintaining a difference in electrostatic charge potential, e.g. so as to prevent changes in charge potential difference and charge build up.

In one or more embodiments, the difference may be maintained or reduced to between 0-8 kV, such as between 0-5 kV or such as between 0-2 kV.

In one or more embodiments, the measured electrostatic charge potential of the individual glass sheets may be measured in opposing locations on the glass sheets, e.g. substantially located directly across from each other, across the VIG unit gap.

The maintenance and/or reduction of the charge potential may be undertaken prior to displacing/transporting the paired VIG unit assembly (comprising the first and second glass sheet), such as transporting the VIG unit assembly between different processing stations, e.g. to a location to be evacuated and/or sealed. The displacement of the paired VIG unit assembly may comprise a relative displacement between one or more contact surface(s) of a handling system, such as a conveyor belt, and the VIG unit assembly, as previously described in the present disclosure. In one or more embodiments, the maintenance and/or reduction may be undertaken more than once, e.g. before, during and after placement of support structures on the first glass sheet and/or pairing of the glass sheet(s) and/or subsequently transporting the paired VIG unit assembly.

By the present invention, charge build up is effectively controlled. Charge transfer occurrences between elements touching or near the VIG unit and a VIG unit assembly may occur during production of the VIG unit, e.g. a handling tool of a handling system comprising interacting parts may create friction and/or vibrations that in turn generates charged ions conducted to the glass surface in contact with the handling tool. A relative displacement between connected parts, i.e. the handling tool and the glass surface, may generate charge ions in the individual parts, such as by contact and subsequent separation of the parts, e.g. as explained by the triboelectric effect. As a result, charge may accumulate on e.g. glass sheets of the VIG assembly prior to providing the vacuum to the VIG unit.

In one or more embodiments, the method comprises the step of handling the VIG unit assembly by physically contacting the VIG unit assembly by one or more contact surface(s) of a handling system, and providing a relative displacement between the one or more contact surface(s) and the VIG unit assembly, wherein the charge modulation system is activated during the relative displacement.

The VIG unit assembly may be handled by supporting, touching, lowering, lifting, pushing, conveying etc. e.g. by means of a conveyor arrangement and/or an industrial robot or any other means. E.g. the relative displacement may be provided in a direction substantially perpendicular to a major surface of the VIG unit assembly, so that a spacing distance changed, wherein the spacing distance is measured between the contact surface(s) and the downward facing major surface of the first glass sheet.

In one or more embodiments, the handling system is arranged to lower the contact surface(s) of the handling system, e.g. provided by a displacement system, so as to create a spacing distance between the contact surface(s), e.g. provided by conveyor belt(s), and the VIG unit assembly. In lowering the contact surface(s) away from the VIG unit assembly, the VIG unit assembly may subsequently be lowered onto a support system, e.g. comprising a plurality of support elements arranged to come into contact with the downward facing surface of the VIG unit assembly e.g. at discrete and separated points thereon.

In one or more embodiments, the method comprises the step of placing the VIG unit assembly at an evacuation and/or sealing station for evacuating and/or sealing the gap between the glass sheets. The placement is preferably undertaken subsequent to providing the relative displacement.

In one or more embodiments, the difference in electrostatic charge potential is reduced or maintained by the charge modulation system up to at least immediately before placing the VIG unit assembly at the evacuation and sealing station, e.g. comprising a heating arrangement e.g. a furnace.

In one or more embodiments, the method further comprises the step of placing the VIG unit assembly in a heating arrangement, e.g., furnace, for heating the VIG unit assembly, and wherein the difference in electrostatic charge potential in the VIG unit assembly is below 8 kV, such as below 5 kV, preferably below 2 kV, when placed inside the heating arrangement.

Advantageously, by the present method step, it is possible to reduce the risk of support structure displacement up until heating the VIG unit, at which point the risk of charge build up is generally non-existing. The VIG unit assembly may be heated in order to seal the gap, optionally, the gap may simultaneously be evacuated.

In one or more embodiments, the charge modulation system comprises one or more ionizing device(s) and/or one or more humidity control system(s) and/or one or more static discharge arrangement(s).

The one or more ionizing devices, humidity control system(s) and static discharge arrangement(s) may comprise any of the features and associated advantages as described according to any embodiments of the first aspect of the present disclosure.

In one or more embodiments, the charge modulation system may comprise one or more ionizing device(s) or humidity control system(s) or one or more static discharge arrangement(s). In one or more embodiments, the charge modulation system may comprise one or more ionizing devices(s) and additionally one or more humidity control system(s) and/or one or more static discharge arrangement(s). In one or more embodiments, the charge modulation system may comprise one or more humidity control system(s) and additionally comprise one or more ionizing devices(s) and/or one or more static discharge arrangement(s). In one or more embodiments, the charge modulation system may comprise one or more static discharge arrangement(s) and additionally comprise one or more ionizing devices(s) and/or one or more humidity control system(s).

By the invention, the charge modulation system significantly reduces the risk of electric discharge events in the VIG unit assembly, in particular via the support structures, by reducing the opportunities of charge build up on the VIG unit assembly.

In one or more embodiments, one or more contact surface(s) of the handling system is provided by the conveyor arrangement, such as by one or more conveyer belt(s) of the conveyor arrangement, wherein the one or more contact surface(s) comprises an electric resistance less than $10^{12}$ ohm/m$^2$ and wherein the method further comprises the step of reducing electrostatic charge on the one or more contact surface(s) by the static discharge arrangement by providing an electrically conductive connection between the one or more electrically conducting contact surface(s) and a ground connection and/or other charge reservoir.

In one or more embodiments, the method comprises the step of providing ions of controlled polarity at one or more outer major surfaces of the vacuum insulated glass (VIG) unit assembly and/or at one or more outer surfaces of a handling system and/or of an element in the vicinity of the VIG unit assembly by the one or more ionizing devices, e.g. so as to change or maintain the electrostatic potential in the glass sheet(s) and/or the handling system and/or an element in the vicinity.

In one or more embodiments, the method comprises the steps of providing humidity control of ambient air surrounding the VIG unit assembly, wherein the humidity control is provided by a humidity control system providing a relative humidity of the ambient air above a minimum threshold level of 30%, such as 35%, or such as 40%.

In one or more embodiments, the electrostatic charge potential of the first glass sheet and/or the electrostatic charge potential of the second glass sheet are reduced and/or maintained by the charge modulation system.

Advantageously, the method allows for selective and flexible maintenance or removal of charges on the individual glass sheets of the VIG unit assembly.

In one or more embodiments, the charge modulation system may be arranged to reduce electrostatic charge potential in one glass sheet, e.g. the first glass sheet, while the charge modulation system may be arranged to maintain charge potential in the other glass sheet, e.g. the second glass sheet. For example, the second glass sheet may be connected to a static discharge arrangement, such as to the ground via the handling system, such that electric charge may be continuously removed from the second glass, while the first glass sheet may be subjected to ions of controlled polarity by an ionizing device or be subjected to sufficiently humid air by the humidity control system, or both.

In one or more embodiments, a maintenance of the electrostatic charge potential may be undertaken in order to ensure low difference in electrostatic charge potential between the glass sheets, and potentially also across the individual glass sheets, e.g. during subsequent handling of the VIG unit assembly subsequent to pairing.

In one or more embodiment, a reduction or maintenance of electrostatic charge potential may be provided substantially evenly across a major surface of the glass sheet(s).

For example, the ionizing device(s) may distribute ions evenly across the major surface(s) of the glass sheet(s) and/or the humidity control system may be arranged to provide a substantially uniform level of humidity within the ambient air surrounding the VIG unit assembly. In this way, any occurrence large potentials within the glass sheet is potentially avoided or reduced, such that the risk of discharge events occurring via the support structures are significantly reduced. E.g. if a large difference in charge potential exist in a glass sheet, it may cause the support structures to move, e.g. sideways, and be displaced.

In one or more embodiments, a change in the electrostatic charge potential of the first glass sheet and the second glass sheet are provided at substantially the same charge modulation rate.

As the change in charge is the same between the glass sheets, discharge events occurring due to high differences in electrostatic charge potential may potentially be reduced. This e.g. may be provided by suitable setup of the charge modulation system, e.g. suitable placement of ionizing device(s), contacts surface(s) and/or distribution of humid air by the humidity control system.

In one or more embodiments, a change in electrostatic charge potential of the first glass sheet and the second glass sheet are substantially mirrored across the gap of the VIG unit assembly.

This e.g. may be provided by the humidity control system, providing humid ambient air evenly distributed about the VIG unit assembly, and/or by suitable positioning and orientation of one or more ionizing devices about the VIG unit assembly and/or by suitable and substantially evenly distribution of contact surface(s) touching the VIG unit assembly.

In one or more embodiments, the charge modulation system provides one or more discharge gradients in one or more glass sheets. In cases where both glass sheets are discharged, the orientation of the discharge gradients are preferably substantially mirrored across the gap, so as to reduce the electrostatic charge potential difference across the gap both after and during charge modulation.

In one or more embodiments, the major surfaces of the glass sheets are of an area of at least 0.7 m$^2$, such as at least 1.0 m$^2$, such as at least 1.2 m$^2$.

It has been discovered that especially larger VIG unit assemblies may suffer from support structure movement due to static electricity discharge. The problem occurring in glass sheets of the above defined size may be further enhanced by providing support structures of a relatively small size compared to the glass sheets, e.g. by having support structure is of a volume less than 0.08 mm$^3$, such as less than 0.06 mm$^3$, or such as less than 0.04 mm$^3$.

In one or more embodiments, each support structure is of a volume less than 0.08 mm$^3$, such as less than 0.06 mm$^3$, or such as less than 0.04 mm$^3$.

The small size of the support structures relative to the VIG unit assembly increases the risk of unwanted movement of the support structures relative to the glass sheets, as the small size of the support structures makes them more susceptible to the electrical field in the gap caused by static electricity.

In one or more embodiments, the support structure is of a diameter of no more than 1 mm and no less than 0.2 mm, such as between 0.3 and 0.8 mm, such as between 0.4 and 0.6 mm. The diameter of the supports structures may not be the same, but may differ e.g. depending on the location of the pillar within the VIG unit assembly. The diameter is measured substantially parallel to a major surface of the first glass sheet.

In one or more embodiments, the support structure is of a height between 0.05 and 0.35 mm, such as between 0.10 and 0.30 mm, such as between 0.15 and 0.25 mm.

In one or more embodiments, the height of the supports structures may not be the same, but may differ e.g. depending on the location of the pillar within the VIG unit assembly. The height is measured substantially perpendicular to a major surface of the first glass sheet.

In one or more embodiments, the support structures are made of metal, such as a metal alloy.

By providing support structures of metal, the support structures are of high strength providing stable and durable maintenance of gap height. However, the metal support structures may also be more susceptible to the electric field in the gap caused by static electricity, e.g. caused during handling of the VIG unit assembly, and may therefore be more prone to unwanted movement. By the present invention, the static electrical field may be reduced and potentially eliminated so as to reduce the risk of unwanted movement of metal support structures. In one or more embodiment, the support structures are made of stainless steel.

There can be several support structure placement possibilities in the production of an assembly for a VIG unit, which are developed with a purpose of maintaining support structure position after placement of the pillars in predetermined positions on a glass surface. One method may comprise fixating pillars to the glass surface by adhering the pillars to the glass surface for example by an adhesive, which can prevent any dislocation of pillars during subsequent production and handling of the assembly.

However, in one or more embodiments of the method of the present disclosure, the method does not employ fixating the support structures to the glass surface in order to prevent any dislocation of pillars during subsequent production and handling of the assembly. The method instead deals with providing free-standing pillars on top of the glass surface of a first glass pane without support or attachment, and with the maintenance of pillar position during subsequent production and handling, such as during combining of the first glass pane including the pillars with a second glass pane. As the support structures are free-standing, unwanted support structure movement may occur at any time between placing the support structures on the first glass sheet until heating/evacuation of the VIG unit assembly.

In one or more embodiments, the support structures are substantially unattached to the first glass sheet.

A minor, e.g. temporary, attachment of the support structures to the first glass sheet may be provided by means of e.g. a small amount of liquid such as water (that may later on be evaporated), but no adhesive or the like may be provided. This may help to reduce the risk of contaminants inside the evacuated gap.

In one or more embodiments, the support structures are free-standing on the upward facing major surface of the first glass sheet of the VIG unit assembly.

In effect, this means that the support structures are not bonded to the first glass sheet, e.g. devoid of any adhesive or other fixation member between the support structure and the first glass sheet. Additionally, this also applies to any contact points between the support structures and the second glass sheet as well. The support structures may be simply placed and resting on the glass sheet surface.

Advantageously, this reduces the risk of introducing further elements into the gap, e.g. adhesive, which may outgas contaminants during the VIG manufacturing process, which potentially can reduce the quality of the VIG unit. Free-standing support structures are on the other hand more susceptible to being dislocated, e.g. by static electricity. However, by the present invention, the likelihood of such dislocation events are significantly reduced.

In one or more embodiments, the support structures are distributed on the upward facing major surface of the first glass sheet in pre-selected pattern.

Advantageously, by the present invention, the pre-selected pattern for the support structures can be maintained and not disrupted by unwanted charge interactions within the VIG assembly. The pre-selected pattern may be symmetric pattern, such as a grid pattern, with pre-selected distances between neighbouring support structures. The pre-selected pattern may preferably be ordered such that it is less disturbing to the user when looking through the VIG unit.

In one or more embodiments, the support structure(s) may comprises a plurality of support pillars.

The VIG unit assembly according to the present disclosure may generally be designed for use for VIG units for windows and/or doors arranged in outer walls and/or roof structures (e.g. in case of a roof window) of buildings. Hence, the first and/or second glass sheet may comprise one or more low-e coatings and/or generally be designed to allow visible light to enter through the glass sheets of the VIG unit. The support structures may be placed on top of a low-e coating.

It is also to be understood that the VIG unit assembly may be designed to comprise more than two glass sheets (e.g. a triple (or more) glass sheet construction), and where several gaps are provided with an intermediate glass sheet there between.

In one or more embodiments, the gap is of a height between the glass panes of the VIG unit assembly between 0.7 mm and 1.3 mm, such as between 0.8 mm and 1.2 mm, such as between 0.9 mm and 1.1 mm.

In the VIG unit assembly, e.g. prior to evacuation, the gap has a height that is larger than the height of a plurality of said support structures placed on the upward facing major surfaces. During evacuation, the glass sheets are forced towards each other and support structures touch both glass sheets. The gap height is measured between major surfaces of the glass sheets facing the gap, along a direction substantially perpendicular to the major surfaces of the glass sheets.

In one or more embodiments, said spacing arrangement comprises an edge seal material, such as a glass edge seal material or a metal edge seal material, arranged around the periphery of said first and second glass sheets.

In one or more embodiments, a glass edge seal material and a metal edge seal material may majorly be made up of glass or metal, respectively. The edge seal material may be in paste, solid or powder form, and may potentially form a seal by heating the edge seal material. During sealing the edge seal material may change shape, and in particular height, so as to conform to the gap height between the glass sheets. In one or more embodiments, the evacuation of the gap may be undertaken after or during heating of the edge seal material.

In one or more embodiments, the spacing arrangement comprises solder material, such as low melting point solder glass material or a metal solder.

By applying solder material, the material may be heated and shaped to conform to the gap height between the glass sheets. While the solder material is soft, the gap may additionally be evacuated, e.g. through an evacuation hole, thereby forcing the glass sheets towards each other and the support structures. When the desired evacuation level is reached, the evacuation hole may be sealed and a VIG unit is provided. By using low melting point solder glass material, the heating can be done at relative low temperatures compared to other solder materials, thereby reducing the risk of damaging the VIG unit by high temperatures. In one or more embodiments, the low melting point glass material is a lead-free low melting point glass material.

In one or more embodiments, the spacing arrangement, e.g. the solder glass material, is provided on the second glass sheet prior to pairing of the first and second glass sheet. Alternatively, the spacing arrangement is provided between the sheets after pairing.

The heating of the edge seal and/or evacuation of the gap may provide that both glass sheets presses towards all the placed support structures, and after this, static electricity will be of no more concern with respect to movement of the support structures.

It is generally to be understood that the handling system may be part of an automation system that is controlled by one or more control systems. This automation system may comprise one or more of: a support structure placement station, a station for providing the second glass sheet on top of the first glass sheet (e.g. with a solder material or the like placed on the second glass sheet), and/or a displacement system for moving the VIG unit assembly to a proper location to be e.g. provided to a heating arrangement (for heating edge seal such as solder glass or metal solder) and/or gap evacuation arrangement for providing a final VIG unit. The automation system may comprise various transport/movement systems for automatically moving the first glass sheet, second glass sheet (without or with the support structures thereon) the VIG assembly and/or the like between the different stations/locations during an overall automated VIG unit assembly manufacturing process and/or an overall automated VIG unit manufacturing process.

In one or more embodiments, the handling system is arranged to transport the VIG unit assembly between one or more processing stations.

In one or more embodiments, the one or more processing stations comprises a support structure placement station comprising a support structure placement system for placing the support structures on the upward facing major surface of the first glass sheet.

In one or more embodiments, the distribution of the support structures on the first glass sheet is undertaken when the first glass sheet is positioned on the conveyor arrangement, e.g. in physical contact with one or more conveyor belt(s) and/or roller(s) of the conveyor arrangement.

In one or more embodiments, the one or more processing stations comprises a pairing station, where the glass sheets are paired with the support structures sandwiched in between, e.g. where the second glass sheet is placed on top of the first glass sheet and the support structures.

In one or more embodiments, one or more processing stations comprises a heating arrangement wherein an edge seal material of the vacuum insulated glass unit is heated and softened. The heating arrangement may be provided by heating arrangement, e.g. a furnace and/or laser.

In one or more embodiments, a relative displacement between the VIG unit assembly and contact surfaces(s) of the handling system is provided between the pairing and the heating station.

In one or more embodiments, one or more processing stations comprises a vacuum system for reducing the pressure in said gap prior to a sealing operation for sealing the gap. The evacuation of the gap may be provided prior, during or after sealing by means of the sealing arrangement. In one or more embodiments, the evacuation may be provided through evacuation hole(s) one of the glass sheets or between the glass sheet(s). The evacuation may be undertaken in an evacuation chamber prior to sealing by the sealing arrangement, such as prior to sealing by a low melting point glass material.

The handling systems may be configured to automatically move the VIG unit assembly, or parts thereof between two or more of said processing stations, e.g. according to predefined settings. E.g. a conveyor arrangement, comprising conveyor belt(s), may move the first glass sheet from the support structure placement station, preferably horizontally, to the pairing station and optionally further to the heating station. The paired VIG unit may be picked up by another handling tool of the handling system between the paring station and the heating station, such as by an industrial robot lifting the VIG unit assembly off the conveyor belt(s).

In one or more embodiments, the method further comprises a step of removing contaminants from the upward facing major surface of the first glass sheet prior to distribution of the support structures, wherein the removal of contaminants is provided by a cleaning system comprises one or more outlets for discharging gaseous medium, such as inert gas, towards the upward facing major surface of the first glass sheet.

Advantageously, by cleaning the upward facing major surface of the first glass sheet prior to support structure distribution, the risk of trapping contaminants between the support structure and the upwards facing major glass surface of the first glass sheet is significantly reduced. This in turn reduces unwanted displacements of the support structure(s) during subsequent handling of the VIG unit assembly.

The present invention further relates to a use of the charge modulation system, according to one or more previous embodiments, for reducing unintentional movement of support structures in a VIG unit assembly, e.g. brought upon by static charge build up.

DRAWING

Figure 2:
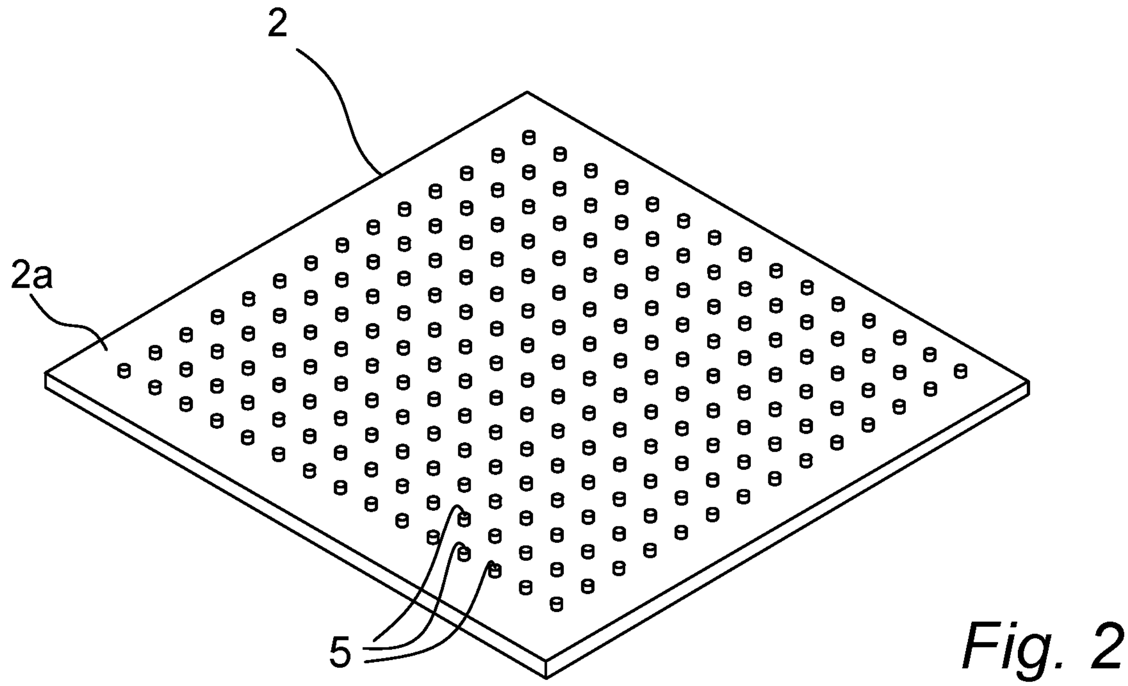
Figure 3:
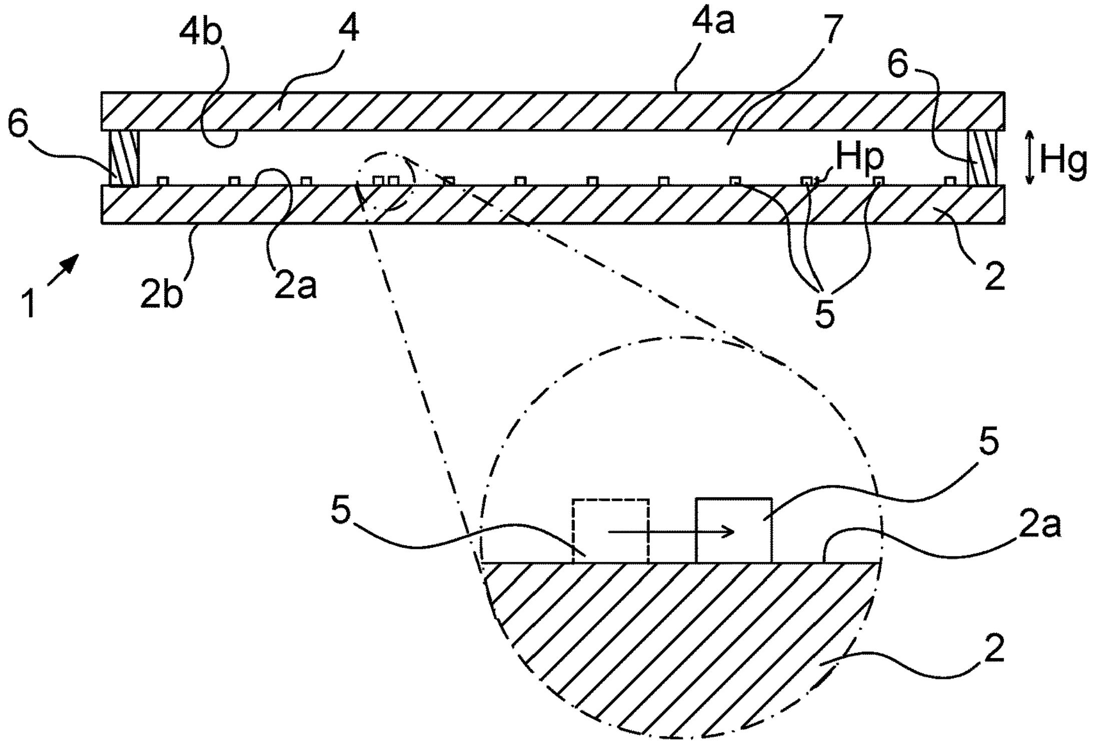
Figure 4:
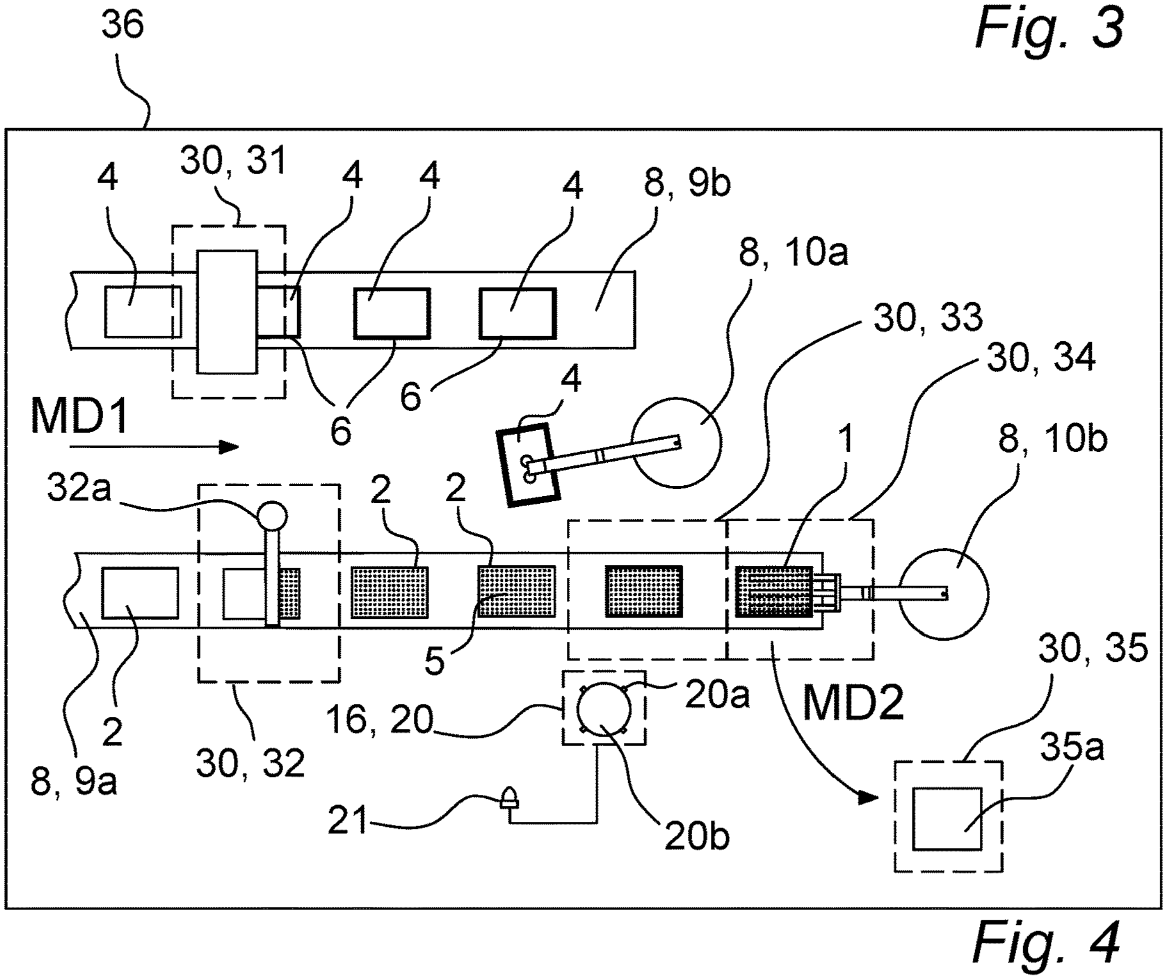
Figure 5A:
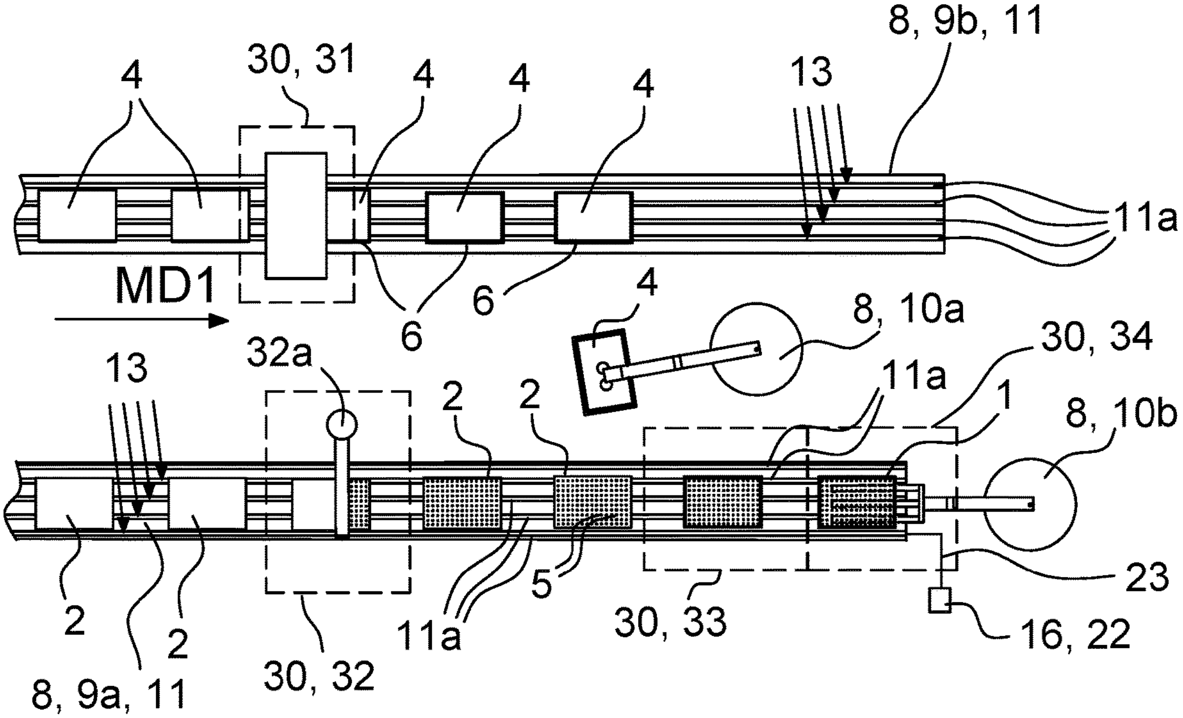
Figure 5B:
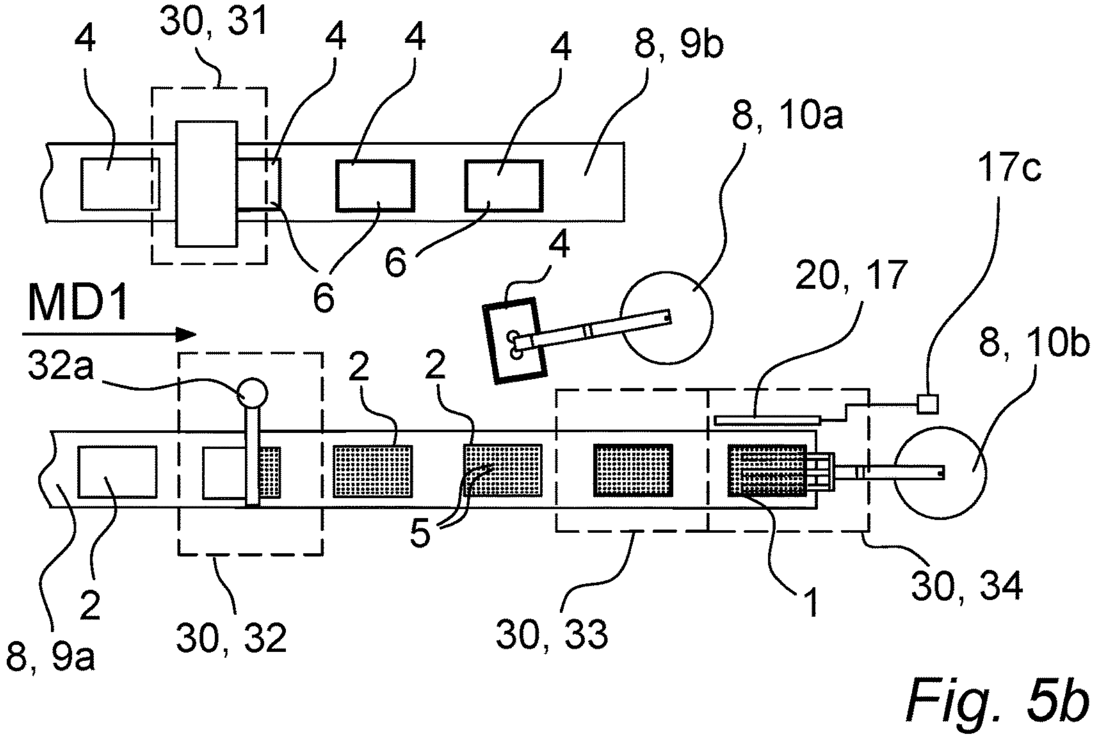
Figure 6:
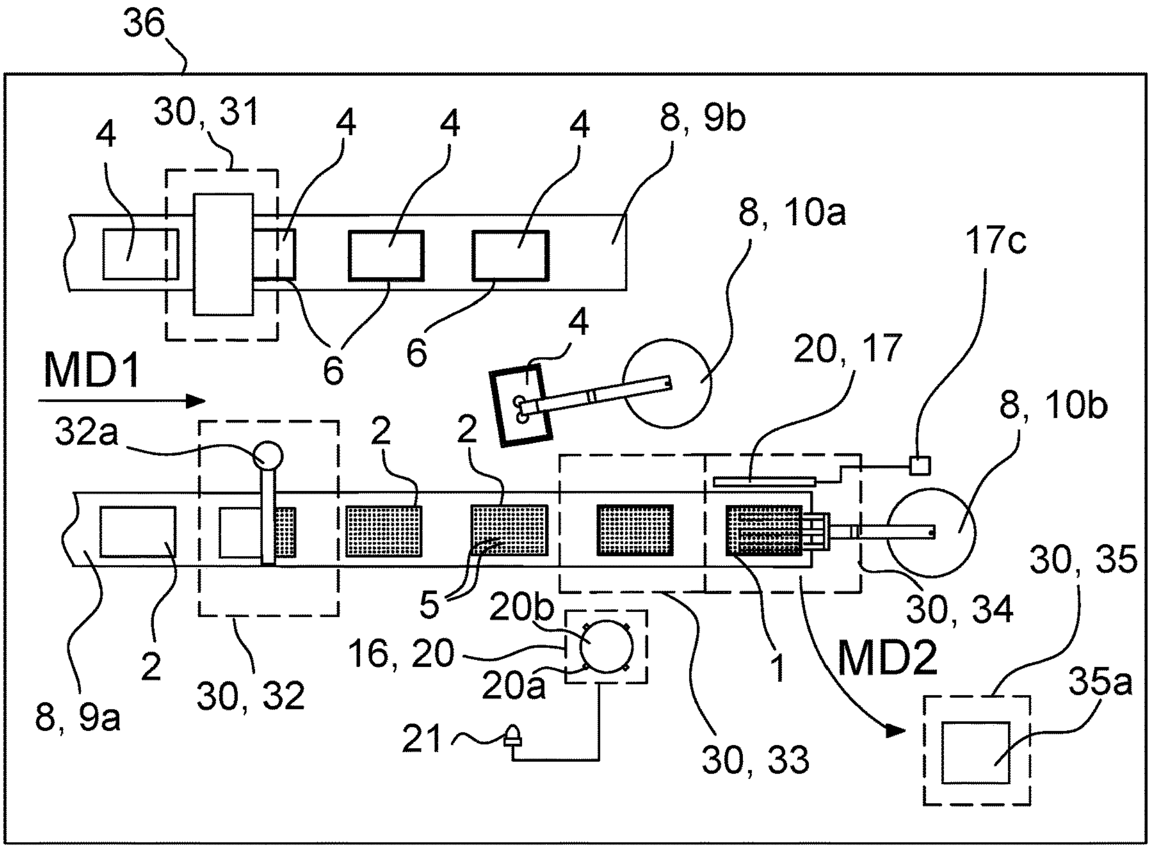
Figure 7:
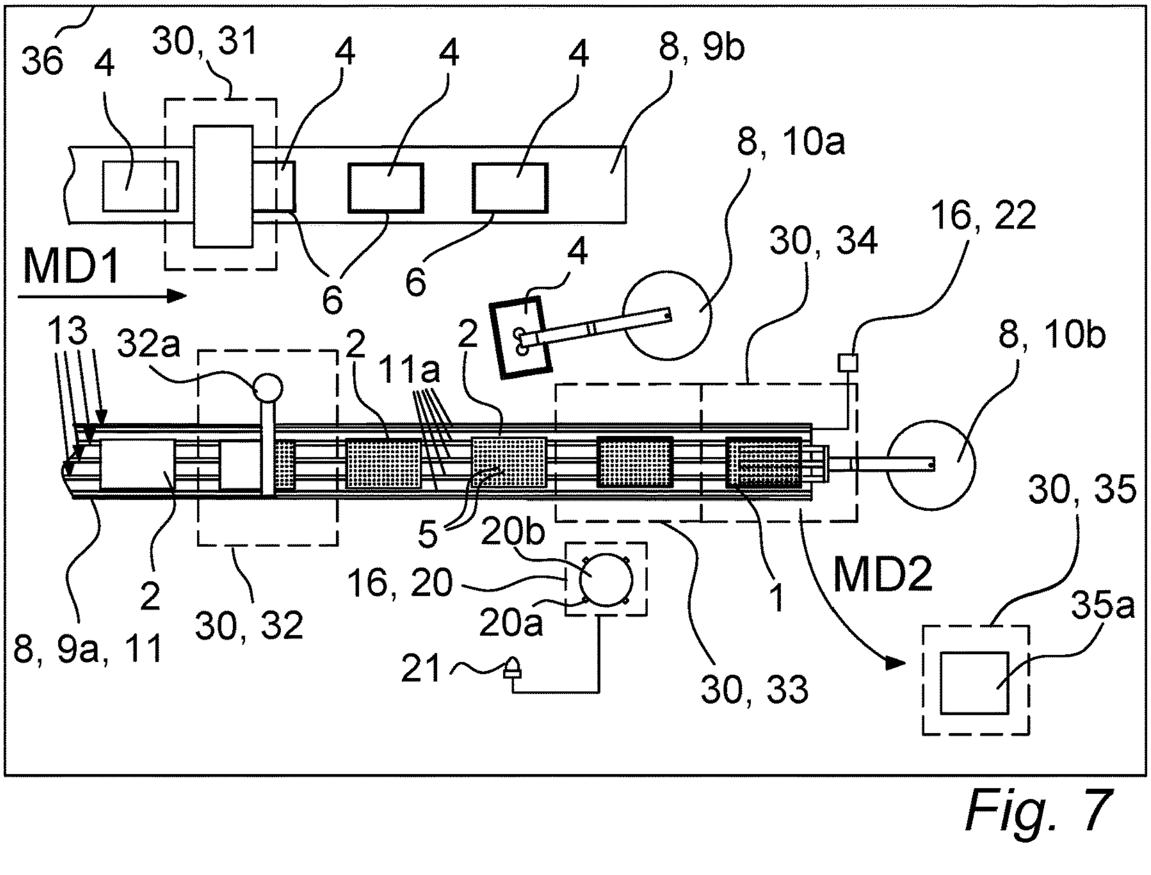
Figure 8:
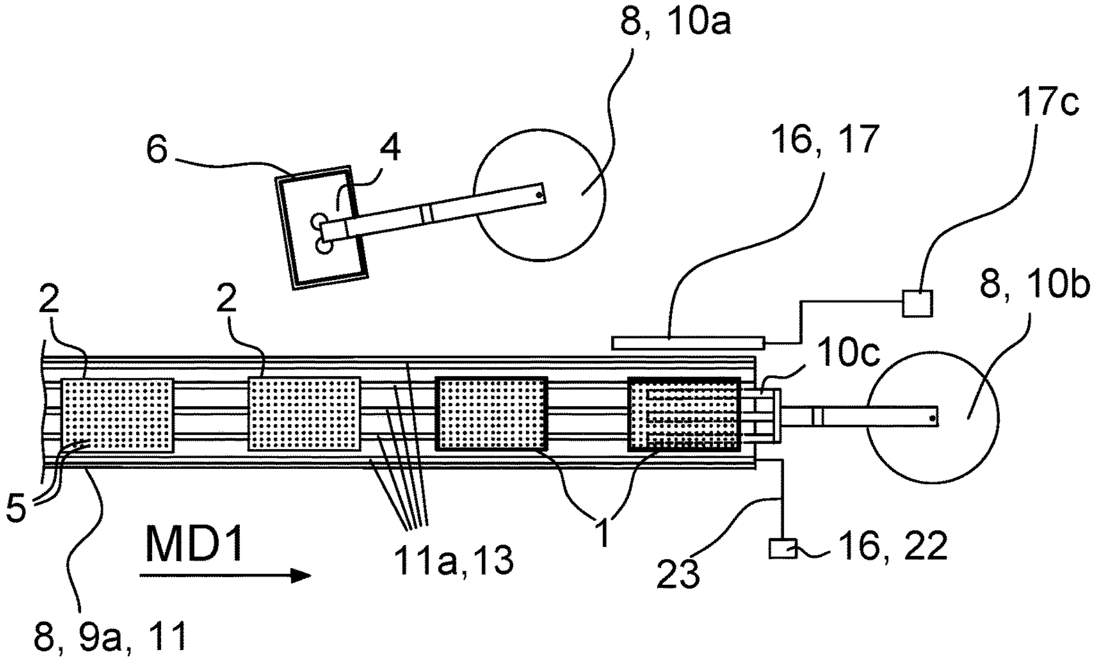
Figure 9:
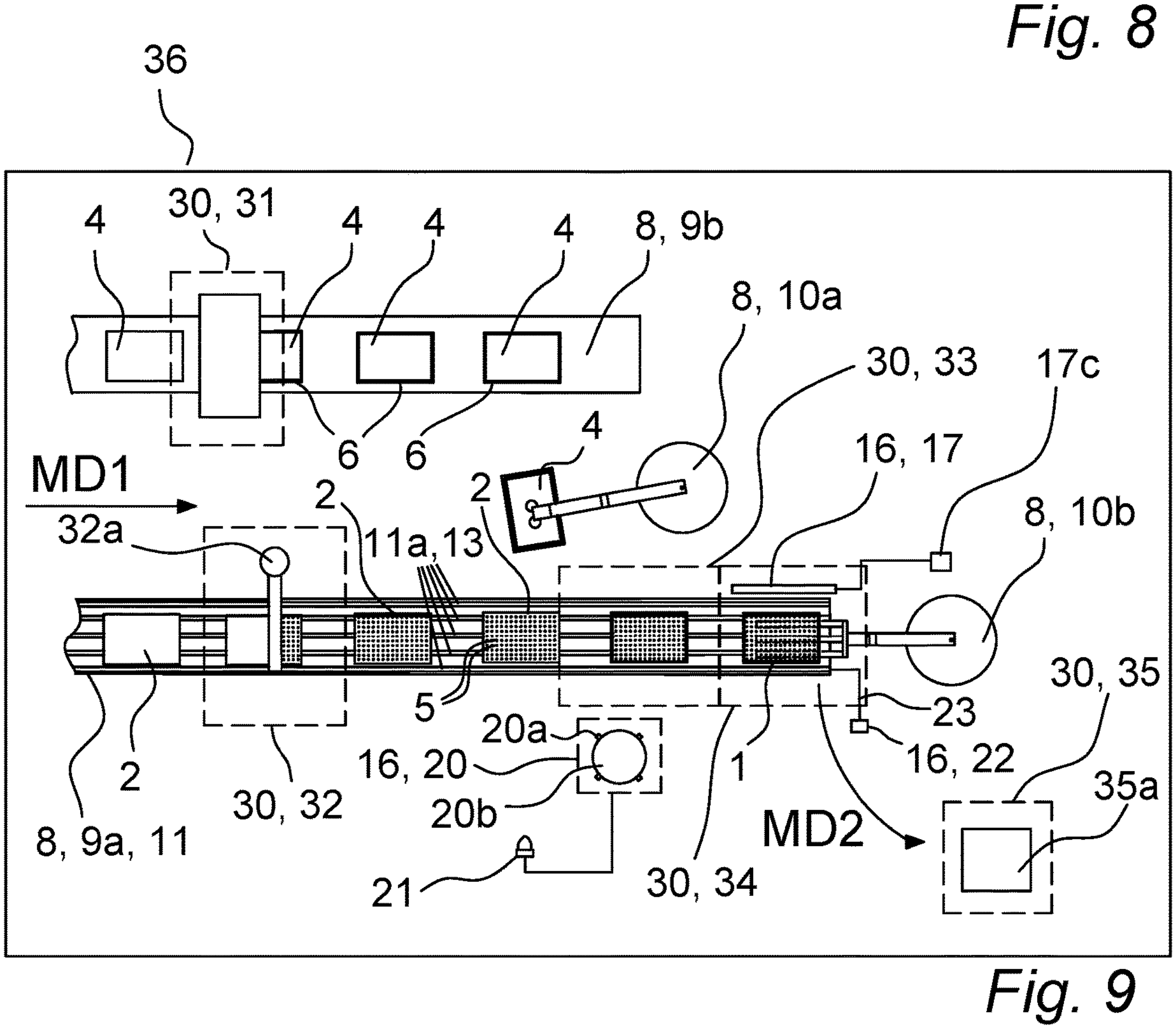

Aspects of the present disclosure will be described in the following with reference to the figures in which:

FIG. 1 shows a VIG unit assembly according to embodiment(s) of the invention, as seen in perspective, FIG. 2 shows a first glass sheet with support structures according to embodiment(s) of the invention, as seen in perspective, FIG. 3 shows a cross-sectional view of a VIG unit assembly according to embodiment(s) of the invention, FIG. 4 shows a top view of a manufacturing facility having a humidity control system according to embodiment(s) of the invention, FIG. 5*a* shows a top view of a manufacturing facility having a static discharge arrangement according to embodiment(s) of the invention, FIG. 5*b* shows a top view of a manufacturing facility having ionizing device(s) according to embodiment(s) of the invention, FIG. 6 shows a top view of a manufacturing facility having a humidity control system and ionizing device(s) according to embodiment(s) of the invention, FIG. 7 shows a top view of a manufacturing facility having a humidity control system and a static discharge arrangement according to embodiment(s) of the invention, FIG. 8 shows a top view of a manufacturing facility having ionizing device(s) and a static discharge arrangement according to embodiment(s) of the invention, FIG. 9 shows a top view of a manufacturing facility having a humidity control system, ionizing device(s) and a static discharge arrangement according to embodiment(s) of the invention.

Figure 10:
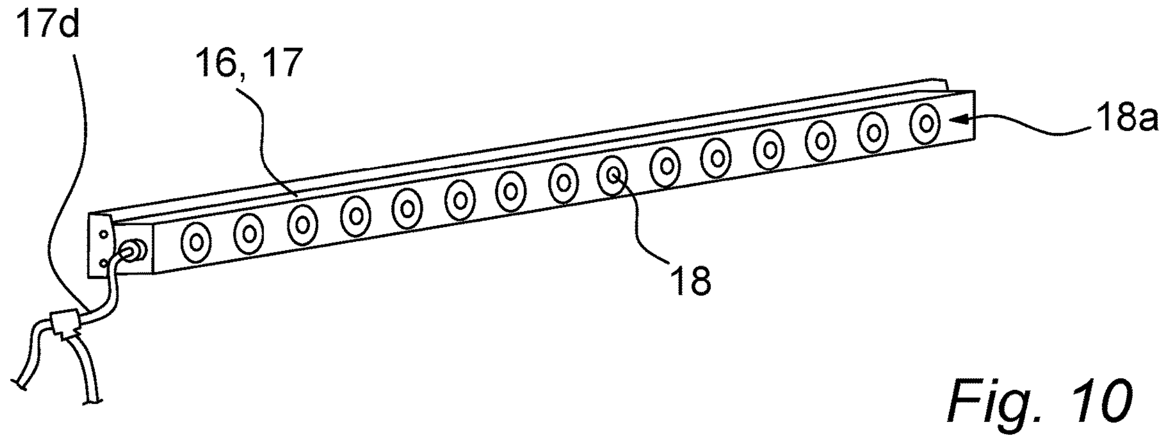
Figure 11A:
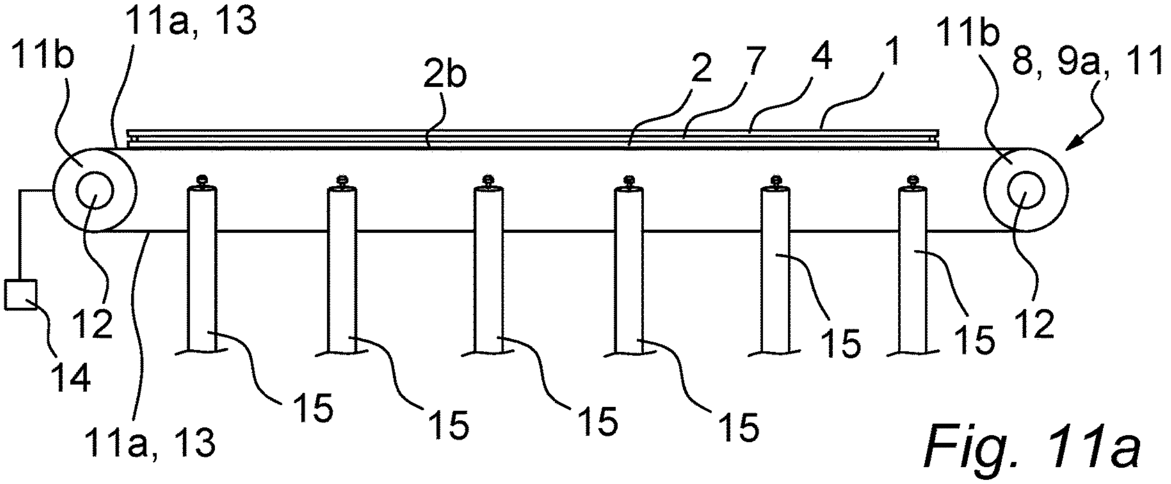
Figure 11B:
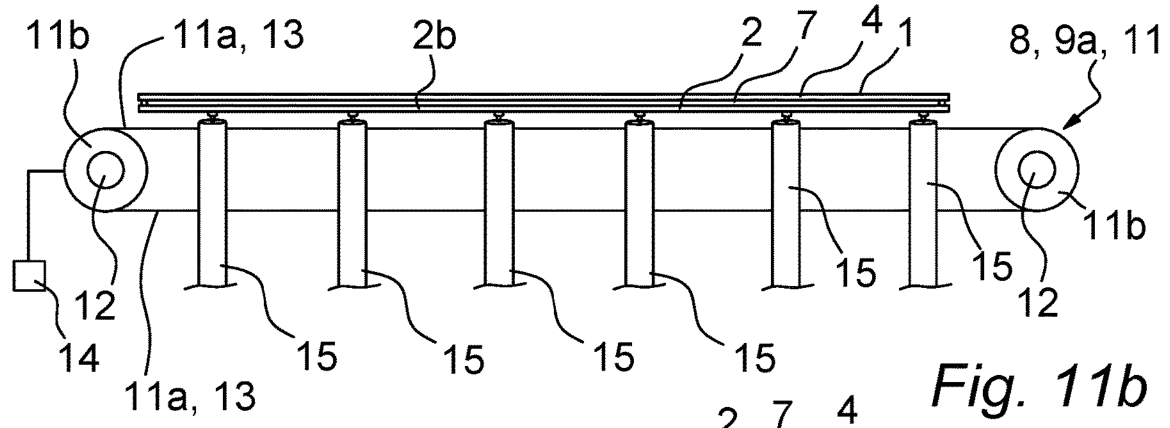
Figure 11C:
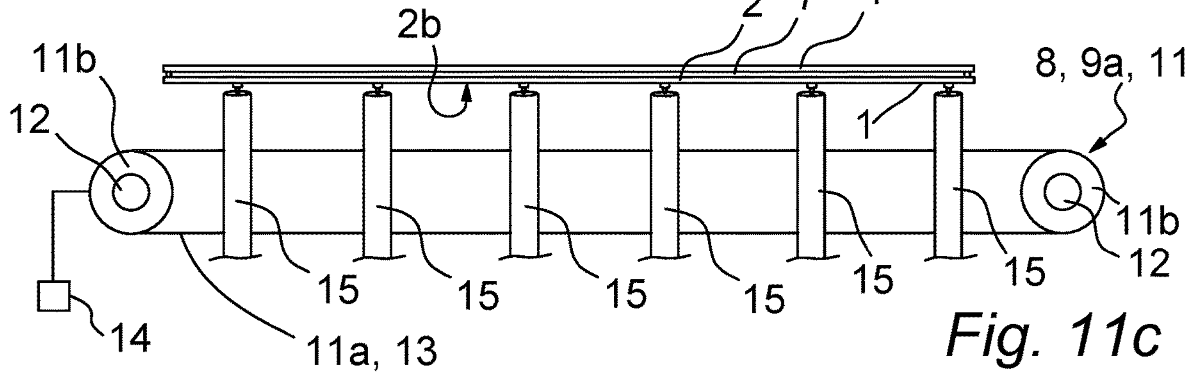
Figure 12:
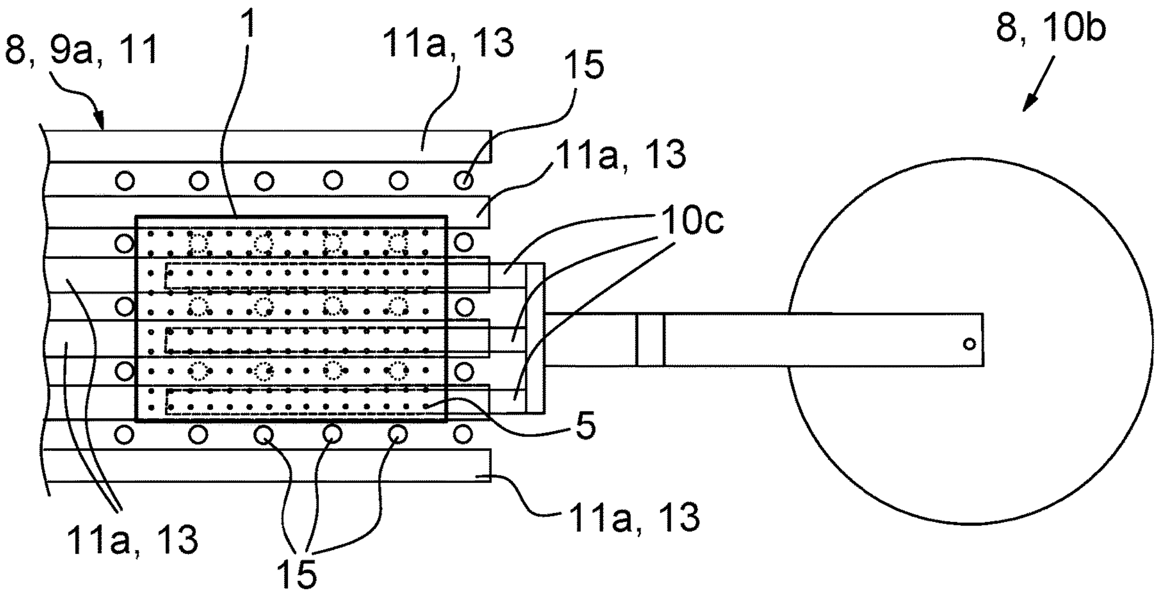
Figure 13:
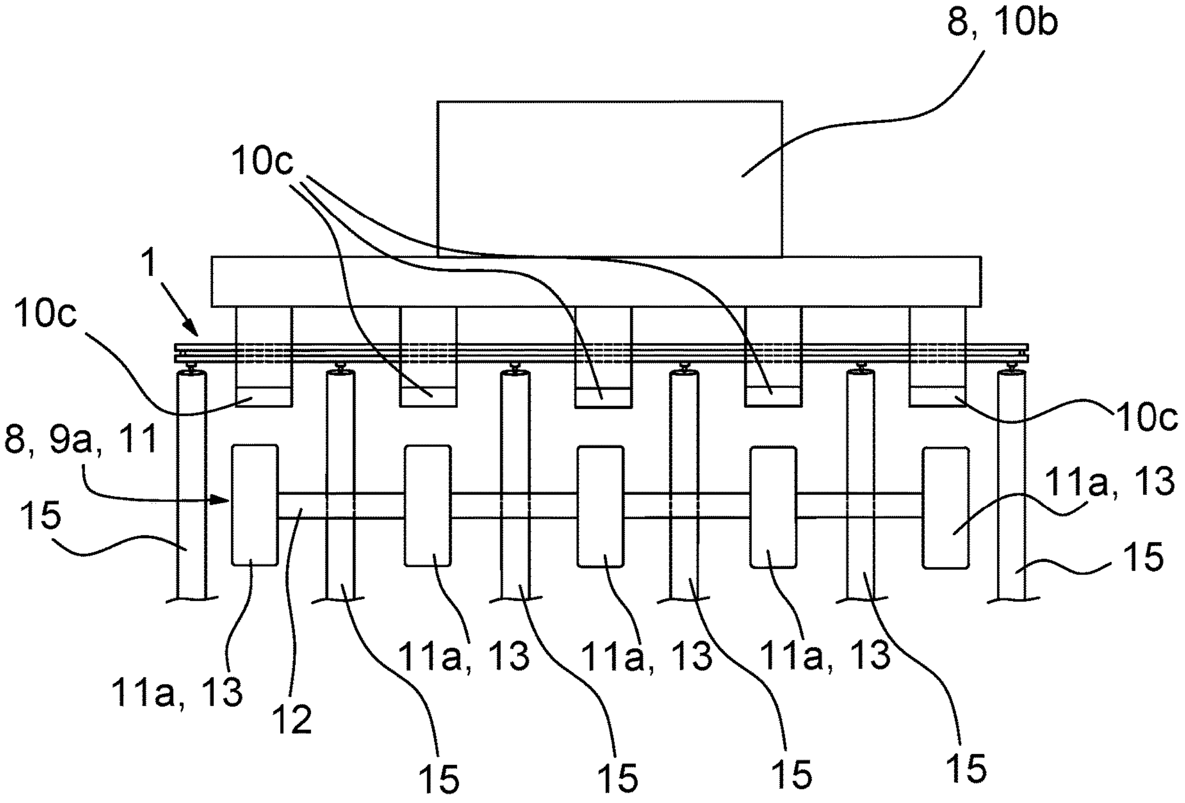
Figure 14A:
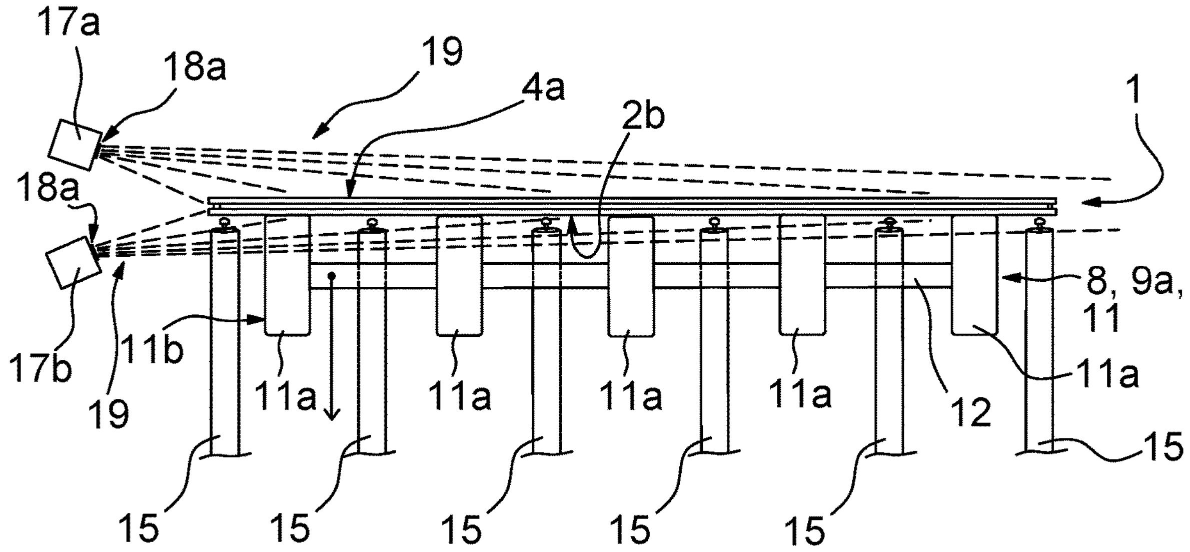
Figure 14B:
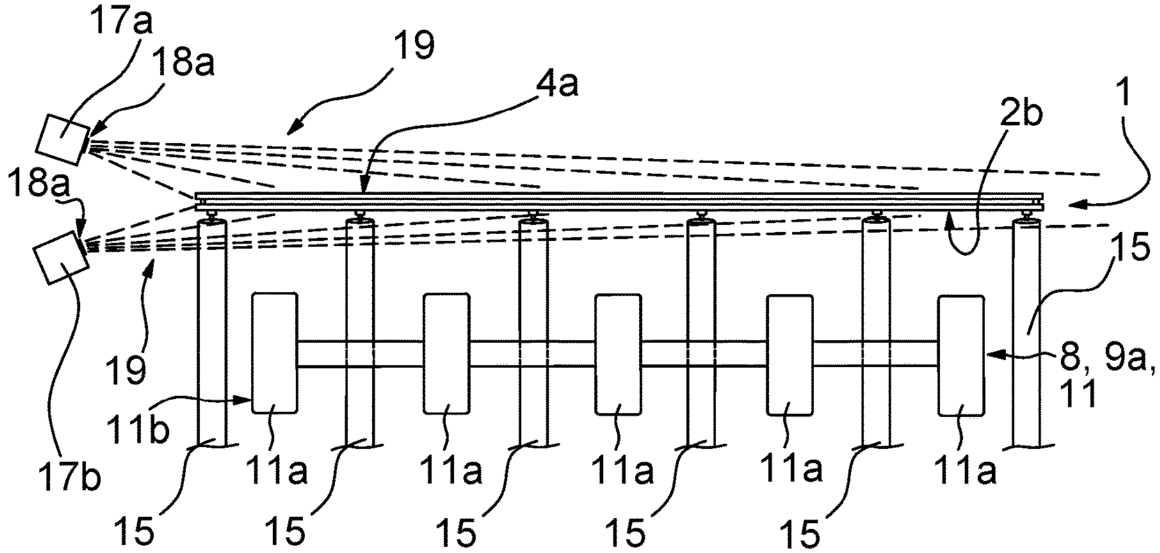

FIG. 10 shows an ionizing device according to embodiment(s) of the invention, as seen in perspective, FIG. 11*a-c* shows side views of the VIG unit assembly and the handling system with different spacing distances according to embodiment(s) of the invention, FIG. 12 shows a top view of a VIG unit assembly and a handling system according to embodiment(s) of the invention, FIG. 13 shows a front view of the VIG unit assembly and the handling system according to FIG. 12, and FIG. 14*a-b* shows front views of the VIG unit assembly arranged on a handling system with different spacing distances, and with ionizing device, according to embodiment(s) of the invention.

DETAILED DESCRIPTION OF THE INVENTION

FIG. 1 shows a VIG unit assembly 1 according to embodiment(s) of the invention, as seen in perspective. The VIG unit assembly 1 comprises a first glass sheet 2 and a second glass sheet 4 with support structures 5 arranged between them. The support structures 5 are usually spaced about 10-60 mm so one VIG assembly can comprise hundreds of support structures 5. During assembly the discrete support structures 5 can be placed by different methods, see for example patent document numbers US2020024891, CN103253874, CN102898045 and US2020087200. Generally, the discrete support structures can be placed in bulk or one row at the time or as individual spacers. All placement methods have different advantages and drawbacks. A subsequent inspection may be used to identify placement errors, see for example patent document numbers CN111718134 and CN102841041, which describe VIG visual support structure inspection systems. The present inventors have discovered that more support structures placement errors occur in industrial production.

FIG. 2 shows the first glass sheet 2 of the VIG unit assembly 1 of FIG. 1. FIG. 2 shows the first glass sheet 2 and a plurality of support structures 5, shown as pillars, placed in a pre-selected pattern on an upward facing major surface of the first glass sheet 2*a*. FIG. 3 shows a cross-sectional side view of the VIG unit assembly 1 of FIG. 1, with edge seal material 6, e.g. low melting point glass solder material, arranged at the edge of the VIG unit assembly 1 between major surfaces of the glass sheets 2*a*, 4*b*. A gap 7 is enclosed by the glass sheets 2, 4 and the edge seal material 6, which is later to be evacuated and sealed in order to provide a VIG unit. In the present view shown in FIG. 3, the height of the support structures Hp is smaller than the height of the gap Hg. The gap height Hg is measured between the downward facing major surface of the second glass sheet 4*b* and the upward facing major surface of the first glass sheet 2*a*. Outer major surfaces of the VIG unit is provided by the downward facing major surface of the first glass sheet 2*b* and the upward facing major surface of the second glass sheet 4*a*.

In the close-up provided in FIG. 3, an exemplary unwanted movement of a support structure 5 is illustrated. The dashed outline of a support structure 5 indicated the desired, and most likely the initial position of the support structure 5, while the solid outline of the support structure 5 indicated the new and unwanted position of the support structure 5 after displacement, e.g. along the arrow indicated. Such displacement may be caused by a static electric field generated in the gap affecting the support structure 5 and causing it to move, e.g. the static charge potential of each glass sheets 2, 4 may be different. The first glass sheet 2 may have a higher electrostatic potential than the second glass sheet 4, for example, the first glass sheet 2 may have a measured electrostatic potential of +25 kV and the second glass sheet 4 may have a measured electrostatic potential of +12 kV. The support structures may be free-standing metal support structures 5, such as steel support structures 5. With free-standing support structure 5 on the first glass sheets 2, which are not yet touched by both glass sheets 2, 4, a displacement of the support structures 5 can occur due to a static electric field generated between the glass sheets 2, 4 of dissimilar electrostatic charge potentials. E.g. through a potential discharge event via the support structure 5, the support structure 5 can typically move towards the second glass sheet 4 and subsequently land back down on the first glass sheet 2. In particular, after pairing of the glass sheets 2, 4, as the support structures 5 are covered by the second glass sheet 4, such unwanted displacement of the support structure 5 can be difficult to fix, without having to separate and compromise the VIG unit assembly 1 and in particular the VIG unit manufacturing process.

Unwanted displacement of one or more support structures can also occur prior to placing the second glass sheet on top of the first glass sheet, e.g. of the VIG assembly shown in FIG. 2. Such displacement may be caused by a static electric field generated between the VIG assembly (comprising the first glass sheet and the support structures) and an element in the vicinity of the VIG unit assembly, such as a plastic screen, handling tool, or the like present in the manufacturing facility. The static electric field may affecting the support structure 5 and causing it to move.

In order to reduce the above discussed unwanted displacement of the support structure, a charge modulation system can be implemented at the manufacturing facility for manufacturing the VIG unit assembly, as described in relation to FIGS. 4-14*b*. Note that not all manufacturing steps for providing the VIG unit assembly or the VIG unit is shown in FIGS. 4-14*b*, mainly the process regarding handling of the VIG unit assembly, in particular after the first and second glass sheets have been paired, is in focus in the present examples.

FIGS. 4-9 shows a handling system 8 providing a first transport system 9*a* for transporting the first glass sheet 2 and/or a second transport system 9*b* for transporting the second glass sheet 4, e.g. both are arranged to move the glass sheets 2, 4 along a moving direction MD1. A first handling tool 10*a* of the handling system, e.g. an industrial robot fixed with suction means, may pick up the second glass sheet 4 and place it on top of the first glass sheet 2, which is provided with support structures 5, whereby the glass sheets 2, 4 are paired. The paired VIG unit assembly 1 is supported on the first transport system 9*a* and may thereafter be further displaced by the first transport system 9*a* and thereafter lifted off the first transport system 9*a* or it may be immediately lifted off the first transport system 9*a* after pairing. A second handling tool 10*b*, such as a tool equipped with arm(s), e.g. installed on an industrial robot, may be introduced underneath the VIG unit assembly 1 so that the assembly 1 can be lifted off the first transport system 9*a*, and further displaced, e.g. along the second moving direction MD2 to an evacuation and sealing station 35, such shown in FIGS. 4, 6, 7 and 9. The handling of the VIG unit assembly 1 by first transport system 9*a* and/or the second handling tool 10*b* is further described in relation to FIGS. 11-14*b*.

FIGS. 4-7 and 9 shows several processing stations 30 of a manufacturing facility, such as an exemplary sealing material distribution station 31 for providing edge sealing material 6, such as low melting point solder glass material, around the edge of the second glass sheet 4 prior to pairing of the glass sheets 2, 4 is shown. FIGS. 4-7 and 9 further shows an exemplary support structure distribution station 32, comprising a support structure placement arrangement 32*a* providing support structures 5 on the first glass sheet 2, prior to pairing of the glass sheets 2, 4. The support structures 5 are preferably free-standing on the first glass sheet 2, and of a height Hp less than the gap height Hg between the glass sheets 2, 4 in the paired VIG unit assembly 1, as shown in FIG. 3. Such sealing material distribution station 31 and/or support structure distribution station 32 may also be provided (however not shown) prior to the pairing of glass sheets 2, 4 as shown in FIG. 8. The pairing of the glass sheets 2, 4 may preferably be provided at a dedicated pairing station 33, but alternatively the pairing step may be executed at the support structure distribution station 32. Subsequent to the pairing of the glass sheets 2, 4 the VIG unit assembly 1 may be positioned at a transfer station 34 at which the VIG unit assembly 1 can be further handled so that it may be transferred to an evacuation and sealing station 35, comprising a heating arrangement 35*a*, as shown in FIGS. 4, 6, 7 and 9. The pairing 33 and transfer station 34 may be provided at the same location, however, preferably the first transport system 9*a* displaces the paired VIG unit assembly 1 from the pairing station 33 to the transfer station 34. Advantageously, physical separation of the processing stations 30 may allow for sufficient room for instruments of each processing station 30 to be able to undertake their function.

In FIGS. 4, 5*a*, 5*b*, 6, 7 and 9, the first and/or second transport systems 9*a*, 9*b* may be any transport systems, which can displace the glass sheets 2, 4 in a preferably horizontal direction, e.g. along the first moving direction MD1, such as a conveyor arrangement 11, employing rollers, e.g. cylindrical, or ball-shaped rollers and/or conveyor belt(s) 11*a*, as shown in FIGS. 5*a*, 7-9.

FIGS. 4, 6, 7 and 9 shows a manufacturing facility providing a sufficiently closed environment 36, as indicated by the dashed rectangular outline, in which the manufacturing of the VIG unit assembly 1 is taking place. Optionally, the manufacturing facility shown in FIGS. 5*a*, 5*b*, 8 may also be comprised in a sufficiently closed environment (not shown).

In FIGS. 4, 6, 7 and 9, a humidity control system 20 is provided as the charge modulation system 16 in the manufacturing facility, which is providing humidity control of ambient air surrounding the VIG unit assembly 1, such that the ambient air has a relative humidity above a minimum threshold level of 30%, such as 35%, or such as 40%. By employing a relatively humid air in the ambient air in which the VIG unit assembly 1 is manufactured, e.g. handled by the handling system 8 for example by the first and second transport systems 9*a*, 9*b* and the handlings tools 10*a*, 10*b*, the risk of unwanted charge build up in surfaces in contact with or near to the VIG unit assembly 1 can be reduced. In turn, this reduces the risk of spontaneous discharge via or near the support structures 5, which can cause them to move. The humidity control system may comprise one or more water discharge arrangements 20*b* having one or more discharge openings 20*a* for introducing water into the ambient air surrounding the VIG unit assembly. The water used may be filtered or otherwise cleaned water free of contaminants, which can potentially compromise the VIG unit. The water discharge arrangement may be located near the production line at which the VIG unit assembly 1 is provided, i.e. near to or enclosed in the pairing station, and/or any previous or subsequent stations along the production line, such as the support structure placement station or transfer station. Exemplary locations of stations 30, 31, 32, 34, 35 are shown in FIG. 4-9.

Optionally, the humidity control system 20 may comprise an alarm system 21, which is equipped to send out an alarm signal, e.g. visual and/or audible, if a threshold level for the humidity has been crossed.

Alternatively, charge modulation may be provided via the handling system 8, such as via the first transport system 9*a* comprising a conveyor arrangement 11 comprising conveyor belts 11*a* arranged to support the VIG unit assembly 1 by a contact surface of the conveyor belts 13, as exemplary shown in FIG. 5*a*. Also, the second transport system 9*b* may be a conveyor arrangement 11 comprising conveyor belts 11*a*; however, it may be alternatively be a different type of transport system. The first and/or second transport systems 9*a*, 9*b* are preferably arranged to displace the glass sheets 2, 4 in a preferably horizontal direction, e.g. along the first moving direction MD1.

In FIG. 5*a*, one or more contact surface(s) of the handling system 13 may be provided by one or more conveyer belts 11*a* of the conveyor arrangement 11, wherein the one or more contact surface(s) 13 comprises an electric resistance less than $10^{12}$ ohm/m$^2$. The contact surface(s) 13 of at least the first transport system 9*a*, preferably both transport systems 9*a*, 9*b*, may be connected to a charge modulation system 16 comprising a static discharge arrangement 22, such that electrostatic charge on the one or more contact surface(s) 13 can be reduced by a static discharge arrangement 22. The static discharge arrangement 22 may provide the reduction by providing an electrically conductive connection between contact surface(s) 13 and a ground connection and/or a different charge reservoir. In this way, charge build up at surfaces in contact with the VIG unit assembly 1 may be reduced, in turn decreasing the possibility of support structure misplacement.

Alternatively, the charge modulation may be provided by one or more ionizing device(s) 17 and an example thereof is shown in FIG. 5*b*. The charge modulation system 16 comprises ionizing device(s) 17 arranged to provide ions of controlled polarity at one or more outer major surfaces 2*b*, 4*a* of the VIG unit assembly 1 and/or at one or more outer surfaces of a handling system 8, and/or in the vicinity of the VIG unit assembly, such as elements close to the VIG unit assembly, so as to change the electrostatic potential in the glass sheet(s) 2, 4 and/or the handling system 8 and/or the element in the vicinity. The ionizing device 17 may be connected to a source of pressurized air 17*a*, which can supply the air to be ionized and further drives the air in a flow direction towards the target surfaces.

In FIG. 4, the charge modulation system 16 is provided by the humidity control system 20. In FIG. 6 the charge modulation system 16 is not only provided by a humidity control system 20 providing humidity control but is further provided by one or more ionizing devices 17 providing ions of controlled polarity at one or more outer major surfaces 2*b*, 4*a* of the vacuum insulated glass (VIG) unit assembly and/or at one or more outer surfaces of a handling system 8, so as to change the electrostatic potential in the glass sheet(s) 2, 4 and/or the handling system 8. By employing the ionizing device(s) 17 in addition to the humidity control, an increased control, e.g. reduction, of the electrostatic potential in the glass sheets 2, 4 may be more readily achieved.

In the present examples shown in FIGS. 5*b* and 6, the ionizing device(s) 17 are elongated in shape, typically referred to as ionizing bars 17. The ionizing device 17 may be arranged with the longitudinal extent thereof along the longitudinal extent of the first transport system 9*a*, e.g. along the first moving direction MD1 of the first transport system 9*a*, so that ions may be provided from a side of the VIG unit assembly 1, e.g. as the VIG unit assembly 1 is static or moving. An example of an ionizing device 17 is seen in FIG. 10, showing the elongated bar including a plurality of flow outlets 18, through which a flow of ions can be provided, e.g. by connecting the ionizing bar 17 by piping connection 17*d* to a source of pressurised gaseous medium, such as air. In one or more examples, two ionizing devices 17 may be provided, one for the first glass sheet 2 and one for the second glass sheet 4.

A line of flow outlets 18*a* provided in the ionizing bar 17 may preferably of a length being larger than at least one dimension of a major surface of the glass sheets 2, 4, e.g. such as the width of the major surface of the glass sheet, the width extending perpendicular to the longitudinal extent of the line of the flow outlets 18*a*.

FIG. 7 shows a charge modulation system 16, which not only provides humidity control by a humidity control system 20, as previously described, but further provides a conveyor arrangement 11 with contact surfaces 13 connected to a static discharge arrangement 22 via an electrically conductive connection 23, such as static discharge arrangement 22 as described in relation to FIG. 5*a*. Charges may thereby be less likely to accumulate on the contact surface(s) of the conveyor belt 13 in contact with the VIG unit assembly 1 and on the VIG unit assembly 1 itself, as charges can both be dissipated through the humid air or the by the static discharge arrangement 22.

In FIG. 8, a handing system 8 provides a first transport system 9*a* comprising a conveyor arrangement 11 having conveyor belts 11*a* each having a contact surface 13 for supporting the VIG unit assembly 1 comprising a first and second glass sheet 2, 4 with a plurality of support structures 5 in between. The charge modulation system 16 is provided by the combination of ionizing device(s) 17 and a static discharge arrangement 22 connected to the conveyor arrangement 11, so that charge build up on the VIG unit assembly 1 can be controlled, e.g. reduced, via the polarized ions provided by the ionizing device 17 and a source of pressurized air 17*c* and by dissipating charges through conductive connections 23, e.g. through the conveyor arrangement 11, away from the VIG unit assembly 1. The conveyor arrangement 11 is preferably arranged to displace the glass sheets 2, 4 in a preferably horizontal direction, e.g. along the first moving direction MD1.

In FIG. 8, the second glass sheet 4 provided with a sealing arrangement 6 may be collected from a second transport system (not shown) by a first handling tool 10*a* of the handling system 8, the second transport system may be any transport system, which preferably can displace the second glass sheet in a preferably horizontal direction, e.g. along the first moving direction MD1, such as a conveyor arrangement, employing rollers, e.g. cylindrical, or ball-shaped rollers and/or belt(s). Optionally a second handling tool 10*b* of the handling system 8, such as a handling tool, e.g. an industrial robot, equipped with arm(s) 10*c*, may be introduced underneath the VIG unit assembly 1 so that the assembly 1 can be lifted off the first transport system 9*a*, and further displaced to e.g. an evacuation and sealing station (not shown).

In FIG. 9, the charge modulation system 16 is provided by humidity control by a humidity control system 20, by providing ions by ionizing device(s) 17 and by providing a conveyor arrangement 11 of the first transport system 9*a* of the handling system 8, which conveyor arrangement 11 is connected to a static discharge system 22. By the present example, the humidity control system 20 can provide an evenly distributed ambient air of controlled humidity, which may sufficiently prevent disadvantageous build up of charges on surfaces of the VIG unit assembly 1 in contact with the ambient air, such as outermost major surfaces of the VIG unit assembly 4*a*, 2*b*. The ionizing device(s) 17 allow for focused supply of polarized ions, e.g. across outermost major surfaces of the VIG unit assembly 4*a*, 2*b*, so as to potentially neutralise static electricity e.g. by allowing combination of the polarized ions and oppositely charged ions at the surface of the VIG unit assembly 1, e.g. the outermost major glass surfaces 2*b*, 4*a*. The supply of polarized ions may be provided as a flow of ionized air generated by the combination of a source of pressurized air 17*c* and the ionizing device 17. The static discharge arrangement 22 provides conductive connection(s) 23 between the contact surface(s) 13 provided by conveyor belts 11*a* of the conveyor arrangement 11 in contact with the VIG unit assembly 1, e.g. in contact with a downward facing major surface of the first glass sheet 2*b*, and a sufficient neutraliser e.g. an electrical ground. In this way, build up of static charges on the contact surface(s) 13 may be reduced, which in turn can reduce or prevent charging the VIG unit assembly 1.

In one or more examples, conductive connection(s) 23 may be provided from the neutraliser, e.g. ground, to all contact surface(s) of a conveyor arrangement 13, which are designed to come into physical contact with the VIG unit assembly 1, in particular prior to evacuation. Additionally, conductive connections may be provided from the neutraliser, e.g. ground connection to any elements which is to come into the vicinity of the VIG unit assembly, e.g. in particular prior to evacuation of the VIG unit assembly. Other handling tools 10*a*, 10*b* or other transport systems 9*b* of the handling system may also be provided with static discharge arrangement(s) 22. In one or more examples, the static discharge arrangement 22 provides a conductive connection 23 to the conveyor belts 11*a* of a conveyor arrangement 11 arranged to support and displace the VIG unit assembly 1. Additionally, each part of the conveyor arrangement 11, which may potentially cause charge generation, may be connected to the static discharge arrangement 22, such that generated charges can be neutralised prior to potentially causing static electricity in the VIG unit assembly 1. A charge generating part may typically comprise surfaces generating charges through friction and relative displacement between the surfaces, such as between conveyor belts 11*a* and rollers of a conveyor arrangement 11*b*. Other charge generating parts may involve bearings, the conveyor structure, and any pulley lagging if present. By the static discharge arrangement 22, a continuous discharge of generated charges in the conveyor arrangement 11 may be provided. In one or more examples, parts of the conveyor arrangement 11 may be sufficiently conductive to provide one or more of the conductive connections 23 of the static discharge arrangement 22.

FIG. 11*a-c* shows an exemplary handling system 8 and VIG unit assembly 1. The handling system 8 comprises a conveyor arrangement 11 with rollers 11*b* and at least one endless conveyor belt 11*a* arranged around said rollers 11*b* so that the belt 11*a* may be displaced by said rollers 11*b*. The rollers 11*b* are fixed on a shaft 12 for driving the rotation of the rollers 11*b*. The conveyor arrangement 11 may be a part of a first transport system 9*a*. A VIG unit assembly 1 is provided to be transported and supported by the conveyor arrangement 11 by the contact surface of the conveyor belt 13. FIG. 11*a-c* shows an example of handling a VIG unit assembly 1 after pairing and before evacuation. The VIG unit assembly 1 is supported on the conveyor belt 11*a* of the conveyor arrangement 11. A plurality of support elements 15 are arranged below the VIG unit assembly 1 and adjacent to the conveyor belt 11*a*.

In order to remove the conveyor belt 11*a* from the VIG unit assembly 1, e.g. so as to ease further handling of the VIG unit assembly 1, the support elements 15 (or additionally or alternatively the conveyor belt 11*a*, including the rollers 11*b*) are arranged to be displaceable in a direction generally perpendicular to a lowermost major surface of the VIG unit assembly 2*b*. As the support elements 15 are moved upwards, the VIG unit assembly 1 remains supported by the conveyor belt 11*a* until the VIG unit assembly 1 come into physical contact with the support elements 15, and the support elements 15 may continue to move upwards as seen in FIG. 11*b*. As seen in FIG. 11*c*, the support elements 15 may be moved to a position providing sufficient vertical space between conveyor belts 11*a* and the VIG unit assembly 1 to allow a handling tool to be introduced in the space. E.g. as seen in FIG. 12, the second handling tool 10*b*, may be introduced in this vertical space, such as by introducing one or more arms of a second handling tool 10*c*, such that the VIG unit assembly 1 may be supported and lifted off the support elements 15.

In one or more examples, the support elements 15 and/or the handling tools 10*a*, 10*c* and/or the transport systems 9*a*, 9*b* may be sufficiently grounded so as to reduce static charge build up which potentially can be transferred to the VIG unit assembly upon physical contact.

In FIG. 11*a-c*, the displacement of the support elements 15 (and/or the conveyor arrangement 11) are undertaken by means of a displacement system 14 arranged to change the position of the support elements (and/or the conveyor arrangement). The displacement of the support elements 15 in FIG. 11*a-b* may optionally be provided according to preselected displacement speed(s), e.g. according to a first speed and subsequently according to a second speed being larger than the first speed, such that the displacement is initially done at a low speed and subsequently at a larger speed. One or both speeds may be changing, e.g. continuously increasing.

FIGS. 12 and 13 shows a top view and a front view respectively, of the VIG unit assembly 1, the support elements 15 and the handling system 8 having a first transport system 9*a* comprising the conveyor arrangement 11 of FIG. 11*a-b*, shown subsequent to transferring the VIG unit assembly 1 on to the support elements 15 as shown in FIG. 11*c*. In FIGS. 12 and 13, a second handling tool 10*b* of the handling system 8 comprises a plurality of arms 10*c* extending generally horizontal and which are inserted between the conveyor belt 10*a* and the VIG unit assembly 1. In the present examples, the conveyor arrangement 11 comprises a plurality of endless conveyor belts 11*a* arranged side by side with the support elements 15 located in between. The conveyor belts provide a contact surface 13 for physical contacting the VIG unit assembly 1, when it is supported thereon. The second handling tool 10*b* may be an industrial robot or other types of automated handling tool allowing for automation of the handling of the VIG unit assembly 1. The handling tool preferably allows for both vertical, horizontal and rotational transport of the VIG unit assembly 1, e.g. to a sealing and evacuation station. In FIG. 12, the support structures arranged inside the VIG unit assembly is also shown.

FIG. 13 shows a front view of FIG. 12, as viewed from behind the handling tool 10*a*, with the arms of the second handling tool 10*c* inserted between the conveyor belts 11*a* and the VIG unit assembly 1 after the VIG unit assembly 1 has been transferred to the support elements 15. In the present example, it can be seen that the rollers 11*b* at each end of the conveyor arrangement 11 are connected to a common shaft 12 allowing for collective rotation of the belts 11*a* around the rollers 11*b* and uniform displacement of the VIG unit assembly 1. Alternatively, the conveyor belts 11*a* may be individually controlled by individual shafts.

During rotation of the endless conveyor belts 11*a* relative to the rollers 11*b* charges may be generated, which in turn may be transferred to the VIG unit assembly 1 in contact with the contact surface of the conveyor belts 13, in particular the lowermost glass sheet of the VIG unit assembly, being the first glass sheet 2, see FIG. 11*a*. The subsequent relative displacement between the VIG unit assembly 1 and the conveyor arrangement 11, as demonstrated in FIG. 11*a-c*, has further shown to increase the electrostatic potential of the first glass sheet 2 and provide a difference in electrostatic charge potential between the first and second glass sheets 2, 4 of the VIG unit assembly 1 and generating a static electric field in the gap 7 potentially causing the support structures arranged therein to move and be displaced (see FIG. 3).

In order to reduce displacement events caused by the static electric field, one or more of the previously described charge modulation systems 16 may be provided, preferably at least a humidity control system 20, as shown in FIG. 4, 6, 7 or 9. Alternatively, a charge modulation system 16 as the one shown in FIG. 5*a*, 5*b*, or 8 may be utilized.

FIG. 14*a-b* shows a front view of an exemplary employment of a charge modulation system 16, e.g. viewed towards and end of the conveyor arrangement 11, wherein the charge modulation system 16 comprises ionizing devices 17, being elongated ionizing bars, each with a line of flow outlet(s) 18*a* directed towards the VIG unit assembly 1, such that a flow of ions 19 can directed onto the VIG unit assembly 1. Preferably, the flow of ions are provided across the majority, such as the entire, uppermost and lowermost major surfaces of the VIG unit assembly. In the present examples, the longitudinal extent of the ionizing bars 17 and the line of flow outlet(s) 18*a* are arranged substantially parallel to a side of the VIG unit assembly 1 and parallel to the moving direction of the VIG unit assembly 1 on the conveyor arrangement 11. The conveyor arrangement comprises an endless belt 11*a* arranged about at least two groups of rollers 11*b*, each group being rotatable by a shaft 12. The conveyor arrangement 11 is preferably comprised in the first transport system 9*a* of the handling system 8, e.g. as described in relation to FIG. 7-9, 11*a-c*-13.

In FIGS. 14*a-b*, the ionizing devices 17 may be fixed in position relative to the VIG unit assembly. The ionizing devices 17 may be activated, such as continuously activated, while a VIG unit assembly is within the field, which can be provided with a flow of ions 19, e.g. ionized air, by the ionizing devices 17. Additionally or alternatively, the ionizing devices 17 may be activated, such as continuously activated, to provide a flow of ions 19 while the substantially vertical relative displacement between the VIG unit assembly 1 and the conveyor arrangement 11 and the support elements 15 is undertaken, as seen in FIG. 11*a-c*. E.g. in FIG. 14*a*, the ionizing devices 17 are shown activated while the VIG unit assembly 1 is supported by the contact surfaces of the conveyor belts 13 and in FIG. 14*b* the ionizing devices 17 are shown activated, while the VIG unit assembly 1 is supported by the support elements 15. The activation may be done automatically. An arrow in FIG. 14*a* shows a direction of an optionally downward displacement of the conveyor arrangement 11 which may be driven by a displacement system (not shown) in order to separate the VIG unit assembly 1 and the conveyor arrangement 11.

In FIG. 14*a-b* the uppermost ionizing device 17*a* is orientated so as to provide an air flow of ions 19 across the uppermost surface of the VIG unit assembly, being provided by the upward facing major surface of the second glass sheet 4*a*, while the lowermost ionizing device 17*b* is orientated so as to provide a an air flow of ions 19 across the lowermost surface of the VIG unit assembly, being provided by the downward facing major surface of the first glass sheet 2*b*. The lowermost ionizing device 17*b* may additionally be arranged to provide an airflow of ions 19 towards the conveyor arrangement 11 and the support elements 15, so as to potentially neutralise any static charge thereon. The uppermost ionizing device 17*a* may comprise a first line of flow outlets 18*a* and the lowermost ionizing device comprises a second line of flow outlets 18*a*, the first line of flow outlets 18*a* extending above the horizontal plane comprising the second glass sheet 4, and the second line of flow outlets 18*a* extending below the horizontal plane comprising the first glass sheet 2.

The charge modulation system 16 and the handling system 8 of FIGS. 14*a-b* may preferably be provided in combination with a humidity control system 20, e.g. as shown in FIG. 6 or FIG. 9.

The invention is further described in the following items:

ITEMS

1. A method of handling a vacuum insulated glass (VIG) unit assembly (1) for a vacuum insulated glass unit, wherein the vacuum insulated glass (VIG) unit assembly (1) comprises:
   a first glass sheet (2),
   a plurality of support structures (5) on an upward facing major surface of the first glass sheet (2*a*),
   wherein the method comprises the steps of:
   handling the VIG unit assembly (1) by physically contacting the VIG unit assembly (1) by one or more contact surface(s) (13) of a handling system (8), and
   providing humidity control of ambient air surrounding the VIG unit assembly (1), wherein the humidity control is provided by a humidity control system (20) providing a relative humidity of the ambient air above a minimum threshold level of 30%, such as 35%, or such as 40%.
2. The method according to item 1, wherein the humidity control system (20) provides a relative humidity of the ambient air below 80%, such as below 70%.
3. The method according to any of the preceding items, wherein the humidity control system (20) provides a relative humidity of the ambient air between 30% and 90% relative humidity, such as between 40% and 80% relative humidity.
4. The method according to any of the preceding items, wherein the method comprises the step of introducing water into the ambient air surrounding the VIG unit assembly (1) through one or more discharge opening(s) (20*a*) of a water discharge arrangement of the humidity control system (20*b*).
5. The method according to any of the preceding items, wherein the humidity control system (20) comprises two or more water discharge arrangements (20*b*) distributed around the VIG unit assembly (1).
6. The method according to any of the preceding items, wherein the method comprises the step of providing ions of controlled polarity at one or more outer major surfaces (2*b*, 4*a*) of the VIG unit assembly (1) and/or at one or more outer surfaces of a handling system (8) by one or more ionizing devices (17).
7. The method according to item 6, wherein the one or more ionizing device(s) (17) provides a flow of ions (19) of controlled polarity towards one or more outer major surfaces of the VIG unit assembly (2*b*, 4*a*) and/or at one or more outer surfaces of a handling system (8), so as to change the electrostatic potential in the glass sheet(s) (2, 4) and/or the handling system (8).
8. The method according to any of the items 6-7, wherein the one or more ionizing devices (17) provides a pressurized flow of ions (19).
9. The method according to any of the items 6-8, wherein the one or more ionizing devices (17) comprises one or more ionizing bars (17) each comprising one or more flow outlet(s) (18) arranged so as to provide at least one line of flow outlet(s) (18*a*) extending across a major surface of VIG unit assembly (2*a*, 2*b*, 4*a*, 4*b*).
10. The method according to any of the items 6-9, wherein the one or more ionizing devices (17) comprises one or more ionizing bars (17) each comprising one or more flow outlet(s) (18) arranged so as to provide a first line of flow outlet(s) (18*a*) extending above a plane comprising a major surface of the VIG unit assembly (2*a*, 2*b*, 4*a*, 4*b*) and a second line of flow outlet(s) (18*a*) extending below the plane comprising the major surface of the VIG unit assembly (2*a*, 2*b*, 4*a*, 4*b*).
11. The method according to any of the items 6-10, wherein the line(s) of flow outlet(s) (18*a*) are arranged parallel to a transport direction of the VIG unit assembly (1).
12. The method according to any of the items 10-11, wherein the flow outlets (18) of the first line (18*a*) are directed towards the upward facing major surface of the second glass sheet (4*a*) and the flow outlets of the second line (18*a*) are directed towards a downward facing major surface of the first glass sheet (2*b*).
13. The method according to any of the preceding items, wherein the method further comprises the step of transporting the VIG unit assembly (1) by a conveyor arrangement (11) comprising one or more conveyor belt(s) (11*a*), conveyor roller(s) and/or conveyor trolley(s) in physical contact with the VIG unit assembly (1), and
    wherein the transportation of the VIG unit assembly (1) by the conveyor arrangement (11) is undertaken in the ambient air subjected to humidity control by the humidity control system (20).
14. The method according to any of the preceding items, wherein the one or more contact surface(s) of the handling system (13) is provided by the conveyor arrangement (11), such as by one or more conveyer belt(s) of the conveyor arrangement (11*a*), wherein the one or more contact surface(s) (13) comprises an electric resistance less than $10^{12}$ ohm/m$^2$ and wherein the method further comprises the step of reducing electrostatic charge on the one or more contact surface(s) (13) by a static discharge arrangement (22) by providing an electrically conductive connection (23) between the one or more electrically conducting contact surface(s) (13) and a ground connection and/or other charge reservoir.

15. The method according to item 14, wherein the static discharge arrangement (22) reduces static charge on one or both glass sheets (2, 4) by one or more electrically conductive connection(s) (23) provided between the static discharge arrangement (22) and the one or more glass sheets (2, 4).

16. The method according to item 15, wherein at least a part of the electrically conductive connection(s) (23) are provided by the conveyor arrangement (11), such as by metal-containing or carbon-containing structures of the conveyor arrangement (11), and/or by one or more electrically conductive brushes in physical contact with the VIG unit assembly (1).

17. The method according to any of the items 14-16, wherein the static discharge arrangement (22) reduces static charge on one or both glass sheets of the VIG unit assembly (2, 4), so that a difference in electrostatic charge potential measured between the first glass sheet (2) and second glass sheet (4) is approximately between 0 kV and 5 kV, such as between 0 kV and 3 kV, preferably between 0 kV and 2 kV.

18. The method according to any of the items 14-17, wherein the static discharge arrangement (22) reduces static charge on one or both glass sheets (2, 4) during transport of the VIG unit assembly (1) on the conveyor belt(s) (11*a*).

19. The method according to any of the preceding items, wherein the method comprises the step of handling the VIG unit assembly (1) by physically contacting the VIG unit assembly (1) by one or more contact surface(s) of the handling system (13), and providing a relative displacement between the one or more contact surface(s) (13) and the VIG unit assembly (1), wherein the relative displacement is undertaken in the ambient air subjected to humidity control by the humidity control system (20).

20. The method according to any of the preceding items, wherein a displacement system of the handling system (8) provides a relative displacement between the one or more contact surface(s) of the handling system (13) and the VIG unit assembly (1), in a direction substantially perpendicular to a major surface of the VIG unit assembly (2*a*, 2*b*, 4*a*, 4*b*), and wherein the relative displacement is undertaken in the ambient air subjected to humidity control by the humidity control system (20).

21. The method according to item 20, wherein the relative displacement is further undertaken while providing ions of controlled polarity at one or more outer major surfaces of the VIG unit assembly (2*b*, 4*a*) and/or at one or more outer surfaces of the handling system (8) by one or more ionizing devices (17).

21. The method according to any of the preceding items, wherein the method further comprises the step of controlling the relative humidity of the ambient air surrounding the VIG unit assembly (1) based on one or more inputs comprising humidity measurement data of the ambient air.

22. The method according to item 21, wherein the humidity control system (20) comprises an alarm system (21) arranged to provide a signal, such an audible and/or visual signal, when the measured humidity in the ambient air is below a minimum threshold level and/or above a maximum threshold level.

23. The method according to any of the preceding items, wherein the vacuum insulated glass (VIG) unit assembly further comprises a second glass sheet (4) on top of the first glass sheet (2), wherein the second glass sheet (4) is arranged so that a downward facing major surface of the second glass sheet (4*b*) faces the support structures (5), and so that the second glass sheet (4) supports on a spacing arrangement (6) providing a gap (7) between said downward facing major surface of the second glass sheet (4*b*) and said upward facing major surface of the first glass sheet (2*a*), wherein said gap (7) has a height (Hg) that is larger than the height of said support structures (Hp) placed on the upward facing major surface of the first glass sheet (2*a*).

24. A method for reducing unintended movement of support structures (5) during handling of a VIG unit assembly (1) for a vacuum insulated glass unit, wherein the insulated glass (VIG) unit assembly (1) comprises:
   a first glass sheet (2), and a plurality of support structures (5) on an upward facing major surface of the first glass sheet (2*a*), wherein the method comprises the step of providing humidity control of ambient air surrounding the VIG unit assembly (1), wherein the humidity control is provided by a humidity control system (20) providing a relative humidity of the ambient air above a minimum threshold level of 30%, such as 35%, or such as 40%.

25. The method according to item 24, comprising features(s) of any of the item(s) 1-23.

26. A method of handling a vacuum insulated glass (VIG) unit assembly (1) for a vacuum insulated glass unit, wherein the VIG unit assembly (1) comprises:
   a first glass sheet (2),
   a plurality of support structures (5) on an upward facing major surface of the first glass sheet (2*a*), wherein the method comprises the step(s) of:
   reducing and/or maintaining a difference in electrostatic charge potential between the first glass sheet (2) and the second glass sheet (4) by a charge modulation system (16), so that the difference in electrostatic charge potential is below 8 kV, such as below 5 kV, preferably below 2 kV.

27. The method according to any of the items 26, wherein the method comprises the step of handling the VIG unit assembly (1) by physically contacting the VIG unit assembly (1) by one or more contact surface(s) of a handling system (13), and providing a relative displacement between the one or more contact surface(s) (13) and the VIG unit assembly (1), wherein the charge modulation system (16) is activated during the relative displacement.

28. The method according to any of the item 26-27, wherein the method further comprises the step of placing the VIG unit assembly (1) in a heating arrangement (35*a*), e.g., furnace, for heating the VIG unit assembly (1), and wherein the difference in electrostatic charge potential in the VIG unit assembly (1) is below 8 kV, such as below 5 kV, preferably below 2 kV, when placed inside the heating arrangement (35*a*).

29. The method according to any of the items 26-28, wherein the charge modulation system (16) comprises one or more ionizing device(s) (17) and/or humidity control system(s) (20) and/or one or more static discharge arrangement(s) (22).

30. The method according to any of the items 26-29, wherein the electrostatic charge potential of the first glass sheet (2) and/or the electrostatic charge potential of the second glass sheet (4) are reduced and/or maintained by the charge modulation system (16).

31. The method according to any of the items 26-30, further comprising any of the feature(s) according to any of the items 1-25.

32. The method according to any of the preceding items, wherein a reduction or maintenance of electrostatic charge potential on one or more of the glass sheets (2, 4) is provided substantially evenly across a major surface of the glass sheet(s) (2*a*, 2*b*, 4*a*, 4*b*).

33. The method according to any of the preceding items, wherein a change in the electrostatic charge potential of the first glass sheet (2) and the second glass sheet (4) is provided at substantially the same charge modulation rate.

34. The method according to any of the preceding items, wherein a change in electrostatic charge potential of the first glass sheet (2) and the second glass sheet (4) is mirrored across the gap of the VIG unit assembly (7).

35. The method according to any of the preceding items, wherein the major surfaces of the glass sheets (2*a*, 2*b*, 4*a*, 4*b*) are of an area of at least 0.7 $m^2$, such as at least 1.0 $m^2$, such as at least 1.2 $m^2$.

36. The method according to any of the preceding items, wherein each support structure (5) is of a volume less than 0.08 $mm^3$, such as less than 0.06 $mm^3$, or such as less than 0.04 $mm^3$.

37. The method according to any of the preceding items, wherein the support structures (5) are made of metal, such as a metal alloy.

38. The method according to any of the preceding items, wherein the support structures (5) are free-standing on the upward facing major surface of the first glass sheet of the VIG unit assembly (2*a*).

39. The method according to any of the preceding items, wherein the support structures (5) are distributed on the upward facing major surface of the first glass sheet (2*a*) in pre-selected pattern.

40. The method according to any of the preceding items, wherein the gap (7) is of a height (Hg) measured between the glass panes (2, 4) of the VIG unit assembly, wherein the height is between 0.7 mm and 1.3 mm, such as between 0.8 mm and 1.2 mm, such as between 0.9 mm and 1.1 mm.

41. The method according to any of the items 23-40, wherein said spacing arrangement (6) comprises an edge seal material, such as a glass edge seal material or a metal edge seal material, arranged around the periphery of said first and second glass sheets (2, 4).

42. The method according to any of the items 23-41, wherein the spacing arrangement (6) comprises solder material, such as low melting point solder glass material or a metal solder.

43. The method according to any of the preceding items, wherein the handling system (8) transports the VIG unit assembly (1) between one or more processing stations (30, 31, 32, 33, 34, 35).

44. The method according to any of the preceding items, wherein the method further comprises a step of removing contaminants from the upward facing major surface of the first glass sheet (2*a*) prior to distribution of the support structures (5), wherein the removal of contaminants is provided by a cleaning system comprises one or more outlets for discharging gaseous medium, such as inert gas, towards the upward facing major surface of the first glass sheet (2*a*).

REFERENCE LIST

1 vacuum insulated glass (VIG) unit assembly
2 first glass sheet
2*a* upward facing major surface of the first glass sheet
2*b* downward facing major surface of the first glass sheet
4 second glass sheet
4*a* upward facing major surface of the second glass sheet
4*b* downward facing major surface of the second glass sheet
5 support structures, e.g. pillars
6 spacing arrangement, e.g. an edge seal material
7 gap
8 handling system
9*a* first transport system
9*b* second transport system
10*a* first handling tool, e.g. an industrial robot
10*b* second handling tool, e.g. an industrial robot
10*c* arms of the second handling tool
11 conveyor arrangement
11*a* conveyor belt
11*b* roller of the conveyor arrangement
12 shaft of the conveyor arrangement
13 contact surface of the handling system e.g. the conveyor belt
14 displacement system of the handling system
15 support element
16 charge modulation system
17 ionizing device, e.g. ionizing bar
17*a* uppermost ionizing device
17*b* lowermost ionizing device
17*c* source of pressurized air
17*d* piping connection
18 flow outlet
18*a* line of flow outlets
19 flow of ions
20 humidity control system
20*a* water discharge arrangement of the humidity control system
20*b* discharge opening(s)
21 alarm system
22 static discharge arrangement
23 electrically conductive connection
30 processing station
31 sealing material distribution station
32 support structure distribution station
32*a* support structure placement arrangement
33 pairing station
34 transfer station
35 evacuation and sealing station
35*a* heating arrangement, e.g. furnace
36 closed environment
Hp height of support structure
Hg height of gap
MD1 first moving direction
MD2 second moving direction

The invention claimed is:

1. A method of handling a vacuum insulated glass (VIG) unit assembly for a vacuum insulated glass unit, wherein the vacuum insulated glass (VIG) unit assembly comprises:

a first glass sheet, a plurality of support structures on an upward facing major surface of the first glass sheet, wherein the method comprises the steps of:

handling the VIG unit assembly by physically contacting the VIG unit assembly by one or more contact surface(s) of a handling system, providing humidity control of ambient air surrounding the VIG unit assembly, wherein the humidity control is provided by a humidity control system providing a relative humidity of the ambient air above a minimum threshold level of 30%, and providing ions of controlled polarity at one or more outer major surfaces of the vacuum insulated glass (VIG) unit assembly and/or at one or more outer surfaces of a handling system by one or more ionizing devices.

2. The method according to claim 1, wherein the vacuum insulated glazing (VIG) unit assembly further comprises a second glass sheet on top of the first glass sheet, wherein the second glass sheet is arranged so that a downward facing major surface of the second glass sheet faces the support structures, and so that the second glass sheet supports on a spacing arrangement providing a gap between said downward facing major surface of the second glass sheet and said upward facing major surface of the first glass sheet, wherein said gap has a height that is larger than the height of said support structures placed on the upward facing major surface of the first glass sheet.

3. The method according to claim 1, wherein the humidity control system provides a relative humidity of the ambient air between 30% and 90% relative humidity.

4. The method according to claim 1, wherein the method comprises the step of introducing water into the ambient air surrounding the VIG unit assembly through one or more discharge opening(s) of a water discharge arrangement of the humidity control system.

5. The method according to claim 1, wherein the one or more ionizing device(s) provides an air flow of ions of controlled polarity towards one or more outer major surfaces of the VIG unit assembly and/or at one or more outer surfaces of a handling system, so as to change the electrostatic potential in the glass sheet(s) and/or the handling system.

6. The method according to claim 1, wherein the one or more ionizing devices comprises one or more ionizing bars each comprising one or more flow outlet(s) arranged so as to provide at least one line of flow outlet(s) extending across a major surface of VIG unit assembly.

7. The method according to claim 1, wherein the one or more ionizing devices comprises one or more ionizing bars each comprising one or more flow outlet(s) arranged so as to provide a first line of flow outlet(s) extending above a plane comprising a major surface of the VIG unit assembly and a second line of flow outlet(s) extending below the plane comprising the major surface of the VIG unit assembly.

8. The method according to claim 7, wherein the flow outlets of the first line are directed towards the upward facing major surface of the second glass sheet and the flow outlets of the second line are directed towards a downward facing major surface of the first glass sheet.

9. The method according to claim 1, wherein the method further comprises the step of transporting the VIG unit assembly by a conveyor arrangement comprising one or more conveyor belt(s), conveyor roller(s) and/or conveyor trolley(s) in physical contact with the VIG unit assembly, and wherein the transportation of the VIG unit assembly by the conveyor arrangement is undertaken in the ambient air subjected to humidity control by the humidity control system.

10. The method according to claim 1, wherein the one or more contact surface(s) of the handling system is provided by the conveyor arrangement by one or more conveyer belt(s) of the conveyor arrangement, wherein the one or more contact surface(s) comprises an electric resistance of less than $10^{12}$ ohm/m$^2$, and wherein the method further comprises the step of reducing electrostatic charge on the one or more contact surface(s) by a static discharge arrangement providing an electrically conductive connection between the one or more contact surface(s) and a ground connection and/or other charge reservoir.

11. The method according to claim 1, wherein a displacement system of the handling system provides a relative displacement between the one or more contact surface(s) of the handling system and the VIG unit assembly, in a direction substantially perpendicular to a major surface of the VIG unit assembly, and wherein the relative displacement is undertaken in the ambient air subjected to humidity control by the humidity control system.

12. The method according to claim 11, wherein the relative displacement is further undertaken while providing ions of controlled polarity at one or more outer major surfaces of the VIG unit assembly and/or at one or more outer surfaces of the handling system by one or more ionizing devices.

13. The method according to claim 1, wherein in the step of handling the VIG unit assembly, the VIG unit assembly is surrounded by ambient air subjected to the humidity control.

14. A method of handling a vacuum insulated glass (VIG) unit assembly for a vacuum insulated glass unit, wherein the insulated glass (VIG) unit assembly comprises:

a first glass sheet, a plurality of support structures on an upward facing major surface of the first glass sheet by means of a support structure placement arrangement, a second glass sheet on top of the first glass sheet, wherein the second glass sheet is arranged so that a downward facing major surface of the second glass sheet faces the support structures, and so that the second glass sheet supports on a spacing arrangement providing a gap between said downward facing major surface of the second glass sheet and said upward facing major surface of the first glass sheet, wherein said gap has a height that is larger than the height of said support structures placed on the upward facing major surface of the first glass sheet, wherein the method comprises the step(s) of:

reducing or maintaining a difference in electrostatic charge potential between the first glass sheet and the second glass sheet by a charge modulation system, so that the difference in electrostatic charge potential is below 8 kV.

15. The method according to claim 14, wherein the method further comprises the step of placing the VIG unit assembly in a heating arrangement for heating the VIG unit assembly, and wherein the difference in electrostatic charge potential in the VIG unit assembly is below 8 kV when placed inside the heating arrangement.

16. The method according to claim 14, wherein the charge modulation system comprises a humidity control system, and wherein the method comprises the step of providing humidity control of ambient air surrounding the VIG unit assembly, wherein the humidity control is provided by the humidity control system providing a relative humidity of the ambient air above a minimum threshold level of 30%.

17. The method according to claim 14, wherein the charge modulation system comprises one or more ionizing device(s), and wherein the method comprises the step of providing ions of controlled polarity at one or more outer major surfaces of the vacuum insulated glass (VIG) unit assembly and/or at one or more outer surfaces of the handling system and/or at an element in the vicinity of the VIG unit assembly, by the one or more ionizing devices.

18. The method according to claim 14, wherein the one or more contact surface(s) of the handling system is provided by a conveyor arrangement by one or more conveyer belt(s) of the conveyor arrangement, wherein the one or more contact surface(s) comprises an electric resistance less than $10^{12}$ ohm/$m^2$, and wherein the method further comprises the step of reducing electrostatic charge on the one or more contact surface(s) by the static discharge arrangement of the charge modulation system by providing an electrically conductive connection between the one or more electrically conducting contact surface(s) and a ground connection and/or other charge reservoir.

19. The method according to claim 1, wherein a change in electrostatic charge potential of the first glass sheet and the second glass sheet are substantially mirrored across the gap of the VIG unit assembly.

20. The method according to claim 1, wherein the support structures are made of metal and/or wherein the support structures are free-standing on the upward facing major surface of the first glass sheet of the VIG unit assembly.

* * * * *